US012195934B2

(12) United States Patent
Sandbrook

(10) Patent No.: US 12,195,934 B2
(45) **Date of Patent: *Jan. 14, 2025**

(54) VEHICLE BARRIER GATE SYSTEM

(71) Applicant: Frogparking Limited, Palmerston North (NZ)

(72) Inventor: Donald H. Sandbrook, Palmerston North (NZ)

(73) Assignee: Frogparking Limited, Palmerston North (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 18/503,461

(22) Filed: Nov. 7, 2023

(65) Prior Publication Data

US 2024/0167237 A1 May 23, 2024

Related U.S. Application Data

(63) Continuation of application No. 17/989,003, filed on Nov. 17, 2022, now Pat. No. 11,821,155.

(51) Int. Cl.
*E05F 15/00* (2015.01)
*E01F 13/06* (2006.01)

(52) U.S. Cl.
CPC .............. *E01F 13/06* (2013.01); *E05F 15/00* (2013.01); *E05Y 2201/46* (2013.01); *E05Y 2900/402* (2013.01)

(58) Field of Classification Search
CPC ................................................ E05Y 2900/402
USPC .............................................................. 49/49
See application file for complete search history.

(56) References Cited

U.S. PATENT DOCUMENTS

| | | | |
|---|---|---|---|
| 1,613,019 A | 1/1927 | Caudle | |
| 1,628,651 A | 5/1927 | Burress | |
| 2,874,493 A | 2/1959 | Mandel | |
| 3,589,086 A | 6/1971 | Fisher | |
| 4,219,969 A | 9/1980 | Reinitz | |
| 4,364,200 A | 12/1982 | Cobb | |

(Continued)

FOREIGN PATENT DOCUMENTS

| | | | |
|---|---|---|---|
| CA | 2700816 A1 * | 9/2010 | .............. E01F 13/06 |
| EP | 4029993 A1 | 7/2022 | |

OTHER PUBLICATIONS

U.S. Appl. No. 18/467,295, filed Sep. 14, 2023, Donald H. Sandbrook.

*Primary Examiner* — Jerry E Redman
(74) *Attorney, Agent, or Firm* — Neustel Law Offices

(57) ABSTRACT

Vehicle barrier systems that can selectively move a barrier arm between a first position that prevents a vehicle from passing, or a second position that allows the vehicle to pass, wherein the barrier arm moves both upwardly away from a travel path and laterally along the travel path in a direction away from the vehicle. The barrier arm movement thereby leads the driver of the vehicle through the barrier system in a sweeping or leading movement. In some embodiments, an actuator assembly of the barrier system includes a breakaway assembly coupled to the barrier arm. In the event that an abnormal force (e.g. vehicle strike, vandalism, etc.) applied to the barrier arm exceeds a predetermined threshold, one or more drive magnets of the breakaway assembly disengage from the one or more magnetically-attractive elements to prevent damage to the barrier system.

20 Claims, 11 Drawing Sheets

(56) References Cited

U.S. PATENT DOCUMENTS

| | | | |
|---|---|---|---|
| 4,655,002 A | 4/1987 | Everson | |
| 4,811,516 A | 3/1989 | Anderson | |
| 5,440,838 A | 8/1995 | Lesser | |
| 5,649,396 A | 7/1997 | Carr | |
| 5,884,432 A | 3/1999 | DeLillo | |
| 6,119,397 A | 9/2000 | Metz | |
| 6,119,399 A | 9/2000 | McCain | |
| 6,288,164 B2 | 9/2001 | Hanzlik | |
| 6,370,821 B1 | 4/2002 | McCord et al. | |
| 6,459,963 B1 | 10/2002 | Bennett | |
| 6,460,292 B1 | 10/2002 | Rodriguez et al. | |
| 6,966,146 B2 | 11/2005 | Pease | |
| 7,237,979 B2 | 7/2007 | Behan et al. | |
| 7,258,461 B1 | 8/2007 | Izardel et al. | |
| 7,563,051 B2 | 7/2009 | Buckley et al. | |
| 7,814,706 B2 | 10/2010 | Gamache | |
| 8,181,392 B1 | 5/2012 | Farber | |
| 8,308,393 B2 | 11/2012 | Jette | |
| 8,794,866 B2 | 8/2014 | Petryshyn | |
| 9,334,686 B2 * | 5/2016 | Oakes | E06B 9/00 |
| 10,907,314 B2 | 2/2021 | Satrom | |
| 11,047,099 B2 | 6/2021 | Hosokawa | |
| 11,214,934 B2 | 1/2022 | Matthews | |
| 11,377,899 B1 | 7/2022 | Sandbrook | |
| 11,761,256 B2 | 9/2023 | Sandbrook | |
| 11,821,155 B1 * | 11/2023 | Sandbrook | E01F 13/06 |
| 2002/0134020 A1 | 9/2002 | Luetzow et al. | |
| 2005/0150612 A1 | 7/2005 | Cook | |
| 2006/0124252 A1 | 6/2006 | Miller | |
| 2007/0079942 A1 | 4/2007 | Snyder | |
| 2008/0038055 A1 | 2/2008 | Jankovsky | |
| 2009/0202296 A1 | 8/2009 | Lamore | |
| 2013/0071182 A1 | 3/2013 | Younce | |
| 2014/0161523 A1 | 6/2014 | Ball | |
| 2015/0033629 A1 * | 2/2015 | Barwick | E06B 11/085 49/13 |
| 2016/0002870 A1 | 1/2016 | Younce | |
| 2017/0336039 A1 | 11/2017 | Pikman | |
| 2019/0134808 A1 | 5/2019 | Alotaibi | |
| 2021/0002835 A1 | 1/2021 | Adler | |
| 2021/0293089 A1 | 9/2021 | Shebib Loiselle | |
| 2022/0090337 A1 | 3/2022 | Menier | |

* cited by examiner

VEHICLE BARRIER GATE SYSTEM

CROSS REFERENCE TO RELATED APPLICATIONS

The present application is a continuation of U.S. application Ser. No. 17/989,003 filed on Nov. 17, 2022, which will issue as U.S. Pat. No. 11,821,155 on Nov. 21, 2023. Each of the aforementioned patent applications is herein incorporated by reference in their entirety.

STATEMENT REGARDING FEDERALLY SPONSORED RESEARCH OR DEVELOPMENT

Not applicable to this application.

BACKGROUND

The described example embodiments in general relate to vehicle barrier gate systems which are positioned above a roadway and which selectively allow (or prevent) vehicles to pass. Vehicle barrier gates are commonly used to control ingress and egress to or from various parking areas such as parking lots, parking ramps, and the like (e.g. parking lot gates). Various designs of vehicle barrier gates have been around for some time, and there are many design variations to overcome issues such as low ceiling heights or constricted spaces.

For example, FIG. 1 shows a prior art barrier system 10 for selectively allowing a vehicle 12 to travel on a travel surface 11 (e.g. roadway, parking garage, etc.). The barrier system 10 includes a main support 14 (e.g. post, bollard, etc.) projecting upwardly from the travel surface 11, and a barrier arm 16 attached to the main support 14 by an actuator assembly 18. The actuator assembly 18 is configured to pivot (or rotate) the barrier arm 16 between a lowered position 20 and a raised position 22. The barrier arm 16 has a length L, and as the actuator assembly 18 rotates the barrier arm 16 about a rotation axis 30, the barrier arm 16 moves from the lowered position 20 through an arc of rotation 24 to the raised position 22.

More specifically, in the lowered position 20, the barrier arm 16 extends substantially horizontally across a travel path 15 of the vehicle 12, with a distal end of the barrier arm 16 being an initial height $H_0$ above the travel surface 11. In the raised position 22, the barrier arm 16 is moved out of the travel path 15 of the vehicle 12 by the actuator assembly 18 to allow passage of the vehicle 12 along the travel path 15, with the distal end of the barrier arm 16 being raised to a raised height $H_1$ above the travel surface 11. As further shown in FIG. 1, if a cartesian coordinate system is aligned such that the travel path 15 of the vehicle 12 is substantially along a z axis, the arc of rotation 24 defined by the movement of the barrier arm 16 lies within the x-y plane, which is substantially vertical with respect to the travel path 15. After the vehicle 12 safely passes the barrier system 10 along the travel path 15, the actuator assembly 18 lowers the barrier arm 16 through the arc of rotation 24, returning the barrier arm 16 to the lowered position 20.

Unfortunately, with at least some prior art barrier systems, the driving experience may be slowed due to poor visibility of the barrier arm 16, which may be blocked from view by a front portion of the vehicle 12 when in the lowered position 20, or may be blocked from view by a ceiling or other support structures (e.g. pillars) as the barrier arm 16 moves into the raised position 22. In some cases, the driver must awkwardly visually monitor the raising of the barrier arm 16 until they are comfortable to pass through, also requiring height comparison with the vehicle 12. Such mental exercises may add to a driver's burden, and may cause stress due to the possibility of hitting the barrier arm 16 if the vehicle 12 is moved forward along the travel path 15 too early, or due to the possibility that the barrier arm 16 may unexpectedly come down onto the vehicle 12 if not pulling through the barrier system 10 fast enough.

In addition, typical barrier arms 16 may become damaged upon collision with a vehicle 12. This can lead to a period of inoperability, as well as time and expenses associated with repairing the barrier system 10 and obtaining compensation from the driver. Thus, although desirable results have been achieved using prior art barrier systems, there is room for improvement.

SUMMARY

Some of the various embodiments of the present disclosure relate to vehicle barrier systems that can selectively move a barrier arm between a first position that prevents a vehicle from passing along a travel path, or a second position that allows the vehicle to pass along the travel path, wherein the barrier arm moves through an arc of movement that extends both upwardly away from the travel path and laterally along the travel path in a direction away from the vehicle. It will be appreciated that because the barrier arm is moved both upwardly away from the travel path and laterally along the travel path in a direction away from the vehicle, an improved view of the movement of the barrier arm may be provided to a driver of the vehicle, while simultaneously "leading" the driver of the vehicle through the barrier system in a sweeping or leading movement by the barrier arm.

In further embodiments, a barrier system includes an actuator assembly that can selectively move a barrier arm between a first position that prevents a vehicle from passing along a travel path, or a second position that allows the vehicle to pass along the travel path, wherein the actuator assembly includes a breakaway assembly coupled to the barrier arm. The breakaway assembly may include one or more drive magnets that are magnetically coupled to one or more magnetically-attractive elements, the one or more drive magnets being configured to remain magnetically engaged to the one or more magnetically-attractive elements as the actuator assembly is actuated to move the barrier arm between the first position to the second position. In the event that an abnormal force applied to the barrier arm exceeds a predetermined threshold, however, the one or more drive magnets disengage from the one or more magnetically-attractive elements to prevent damage to the barrier system.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

Figure 1:
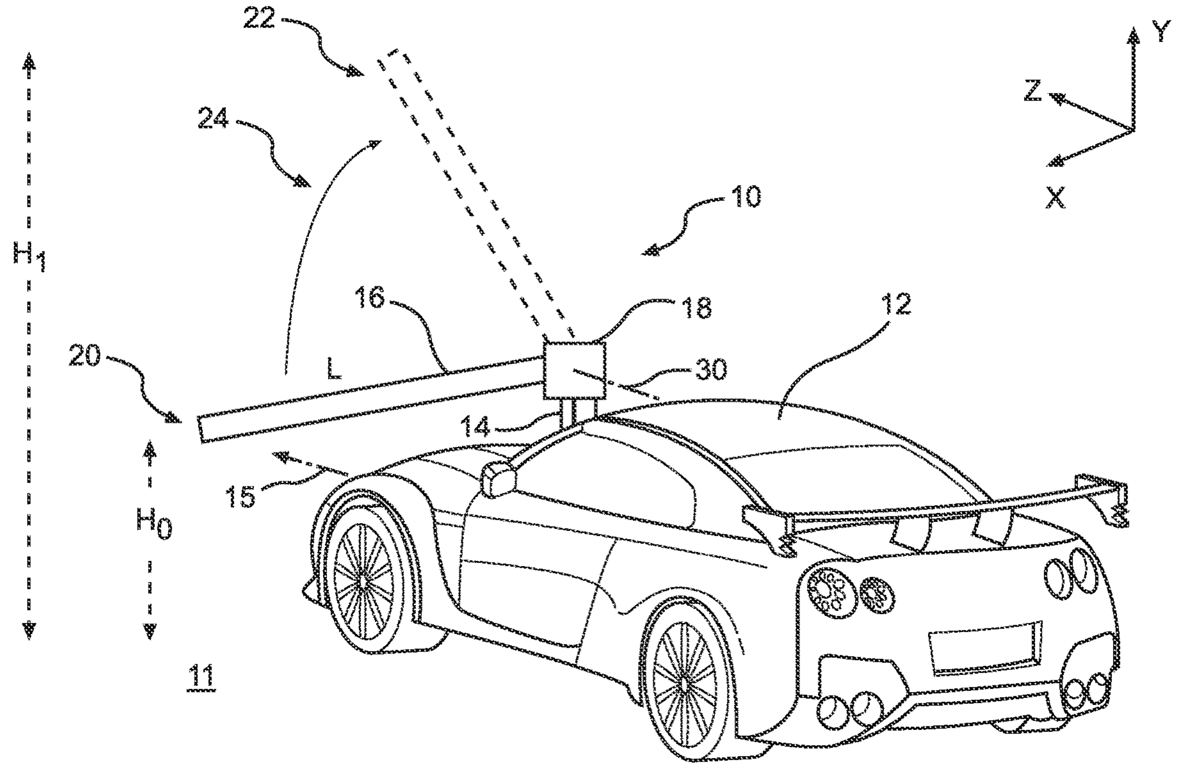
FIG. 1 (PRIOR ART)
FIG. 1 is a perspective view of a vehicle barrier system in accordance with the prior art.

Some of the various embodiments of the present disclosure relate to a vehicle barrier system configured to move the barrier arm between a lowered position and a raised position (and vice versa) in a novel way that provides an improved driving experience to the driver of the vehicle. More specifically, in at least some embodiments, a barrier system in accordance with the present disclosure may advantageously improve the visibility of the barrier arm to a driver of a vehicle during movement of the barrier arm between the lowered position and the raised position, reducing distraction and possible stress on the driver as the driver operates the vehicle through the vehicle barrier system.

For example, in some of the various embodiments of the present disclosure, a barrier system may include a barrier arm 116 having a proximal end 126 and a distal end 128 opposite from the proximal end 128, and a main support 114 configured to attach to a support surface 111. An actuator assembly 118 is coupled between the main support 114 and the proximal end 126 of the barrier arm 116. The actuator assembly 128 is configured to selectively move the barrier arm 116 between a lowered position 120 wherein the barrier arm 116 is positioned at least partially in a travel path 15 of a vehicle 12 to prevent passage of the vehicle 12 along the travel path 15, and a raised position 122 wherein the barrier arm 116 is positioned out of the travel path 15 to allow passage of the vehicle 12 along the travel path 15, the actuator assembly 118 being configured to move the distal end 128 of the barrier arm 116 from the lowered position 120 to the raised position 122 such that the distal end 128 of the barrier arm 116 moves through an arc of movement 124 that extends both upwardly away from the travel path 15 and laterally along the travel path 15 in a direction away from the vehicle 12.

In addition, in some embodiments, the main support 114 comprises a bollard 114 that projects upwardly from the support surface 111 at a tilt angle $\alpha$ (with respect to vertical) such that the bollard 114 is tilted in a direction opposite from the travel path 12. In such embodiments, the actuator assembly 218 may be configured to move the barrier arm 116 such that the arc of movement 124 lies within a movement plane 132, the movement plane 132 being sloped upwardly with respect to the travel path 15.

In further embodiments, the actuator assembly 418 includes a drive bracket 448 rotatably coupled to the main support 114 and an arm bracket 452 coupled to the proximal end 126 of the barrier arm 116, the drive bracket 448 being coupled to the arm bracket 452 by a breakaway assembly 440. The drive bracket 448 and the arm bracket 452 are rotatable about an axis of rotation 130 as the barrier arm 116 is moved from the lowered position 120 to the raised position 122. In some embodiments, the breakaway assembly 440 includes at least one magnetically-attractive element 454 coupled to the arm bracket 452 and radially spaced apart from the axis of rotation 130, and at least one drive magnet 450 coupled to the drive bracket 446 and radially spaced apart from the axis of rotation 130 and aligned with the at least one magnetically-attractive element 454 when the drive bracket 446 is engaged with the arm bracket 452. The at least one drive magnet 450 remains magnetically engaged to the at least one magnetically-attractive element 454 as the actuator assembly 418 is actuated to move the barrier arm 116 between the lowered position 120 to the raised position 122, and disengages from the at least one magnetically-attractive element 454 in response to an abnormal force 415 applied to the barrier arm 116 to disengage the drive bracket 448 from the arm bracket 452 when the abnormal force 415 exceeds a pre-determined threshold.

These and other aspects of various embodiments of barrier systems in accordance with the present disclosure are described in further detail below with reference to the accompanying figures.

B. Exemplary Embodiments

FIGS. 2-9 show a barrier system 110 for selectively allowing a vehicle 12 to travel on a travel surface 11 (e.g. roadway, parking garage, etc.) in accordance with the present disclosure. In some embodiments, the barrier system 110 includes a main support 114 (e.g. post, bollard, etc.) projecting upwardly away from the travel surface 11, and a barrier arm having a proximal end 126 and a distal end 128. It may be noted that in the embodiment shown in FIGS. 2-9, the main support 114 is tilted with respect to vertical by a tilt angle $\alpha$. The barrier arm 116 is attached to the main support 114 by an actuator assembly 118. The actuator assembly 118 is coupled to the proximal end 126 of the barrier arm 116, and is configured to move the barrier arm 116 between a lowered position 120 and a raised position 122. More specifically, in some embodiments, the barrier arm 116 has a length L, and the actuator assembly 118 rotates the barrier arm 116 about a rotation axis 130, moving the barrier arm 116 from the lowered position 120 to the raised position 122 such that the distal end 128 of the barrier arm 116 moves through an arc of movement 124.

Figure 2:
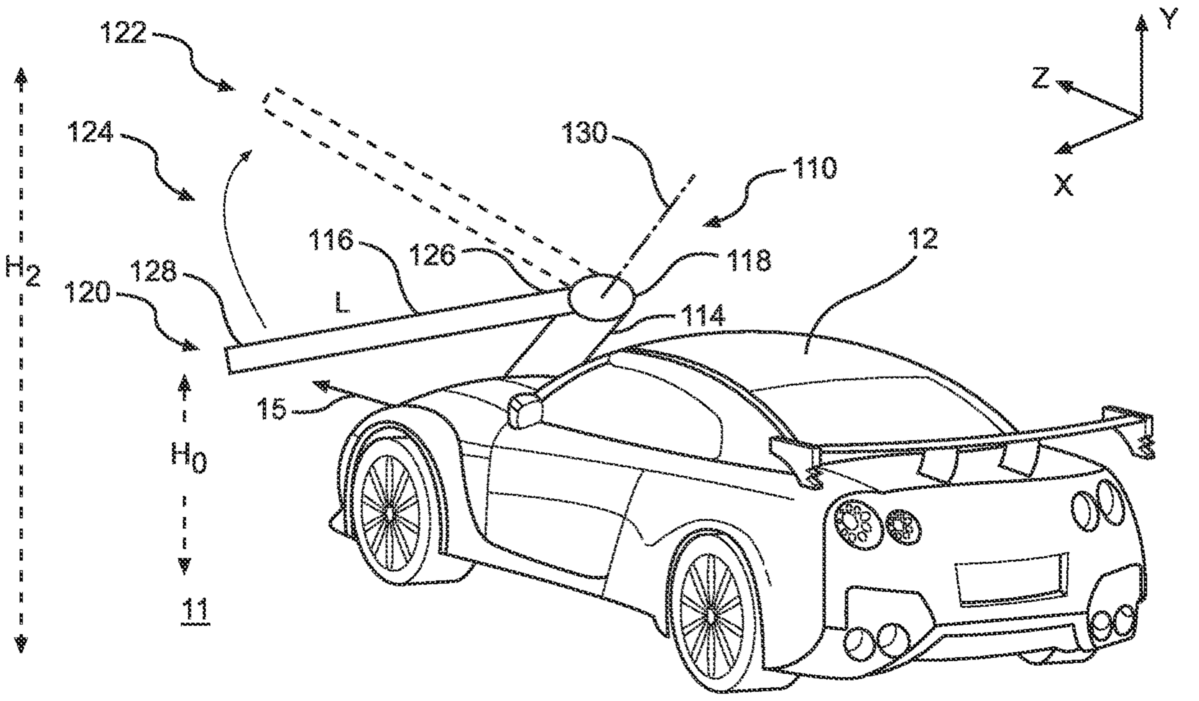
FIG. 2 is a perspective view of a vehicle barrier system in accordance with an example embodiment.
Figure 3:
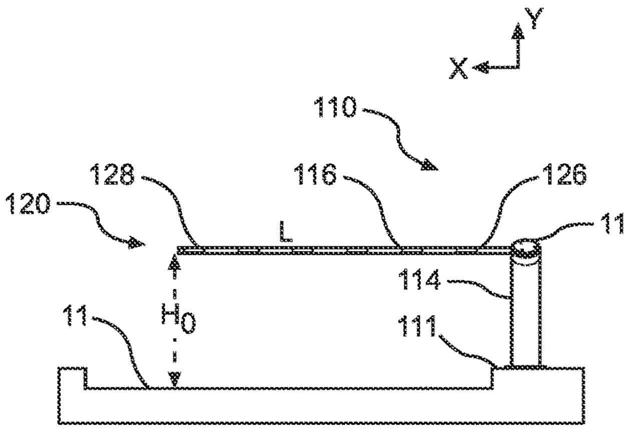
FIG. 3 is a front elevational view of the vehicle barrier system of FIG. 2 in a lowered position as viewed along a z axis in accordance with an example embodiment.

More specifically, as best shown in FIGS. 2 and 3, in the lowered position 120, the barrier arm 116 extends substantially horizontally across a travel path 15 of the vehicle 12, with the distal end 128 of the barrier arm 116 being an initial height $H_0$ above the travel surface 11. In the raised position 122 (FIGS. 2 and 5-6), the barrier arm 116 is moved out of the travel path 15 of the vehicle 12 by the actuator assembly 118 to allow passage of the vehicle 12 along the travel path 15, with the distal end 128 of the barrier arm 116 being raised to a raised height $H_2$ above the travel surface 11.

Figure 5:
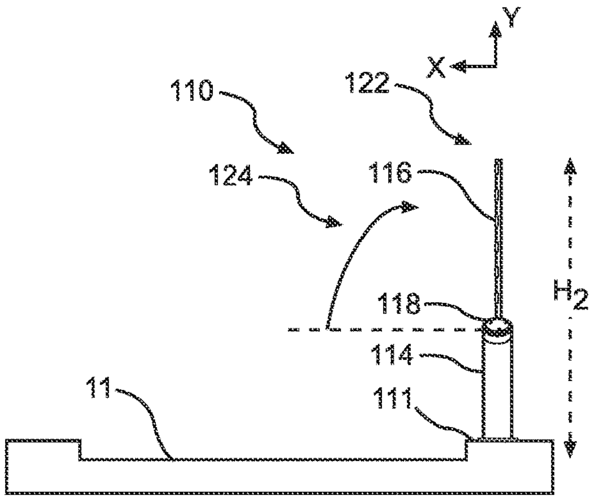
FIG. 5 is a front elevational view of the vehicle barrier system of FIG. 2 in a raised position as viewed along the z axis in accordance with an example embodiment.
Figure 6:
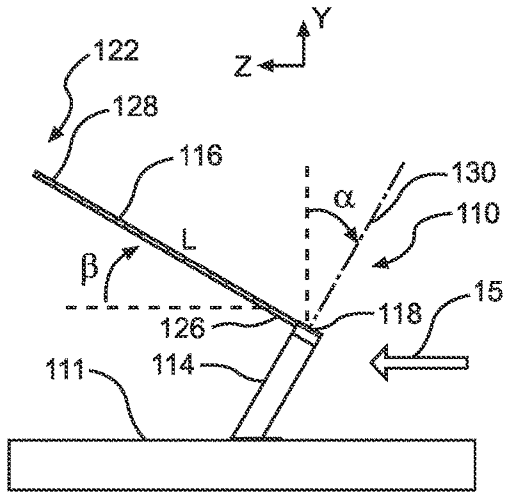
FIG. 6 is a side elevational view of the vehicle barrier system of FIG. 2 in the raised position as viewed along the negative x axis in accordance with an example embodiment.

In some embodiments, as best shown in FIG. 6, the actuator assembly 118 is configured to rotate the barrier arm 116 into the raised position 122 such that the barrier arm 116 extends at a slope angle $\beta$ with respect to the travel surface 11 (or with respect to the travel path 15 of the vehicle 12). Moreover, in some embodiments, the slope angle $\beta$ of the barrier arm 116 may be equal to (or approximately equal to) the tilt angle $\alpha$ of the main support 114. As shown in FIG. 5, in the raised position 122, the distal end 128 extends to the raised height $H_2$ above the travel surface 11.

As further shown in FIGS. 2-7, in some embodiments, if a cartesian coordinate system is aligned such that the travel path 15 of the vehicle 12 is substantially along a z axis, the arc of rotation 124 defined by the movement of the distal end 128 of the barrier arm 116 lies within a plane of movement that is sloped upwardly (i.e. non-vertically) with respect to the travel path 15 of the vehicle (which lies within an x-z plane of the cartesian coordinate system). In other words, the actuator assembly 118 is configured to move the barrier arm 116 from the lowered position 120 to the raised position 122 such that the distal end 128 of the barrier arm 116 moves through an arc of movement 124 that extends both upwardly away from the travel path 15 and laterally along the travel path 15 in a direction away from the vehicle 12. After the vehicle 12 safely passes the barrier system 10 along the travel path 15, the actuator assembly 118 lowers the barrier arm 116 through the arc of rotation 124, returning the barrier arm 116 to the lowered position 120.

It will be appreciated that because the barrier arm 116 is moved by the actuator assembly 118 both upwardly away from the travel path 15 and laterally along the travel path 15 in a direction away from the vehicle 12, the movement of the barrier arm 116 may be maintained within view of the driver of the vehicle, while simultaneously "leading" the driver of the vehicle 12 through the barrier system 110 in a sweeping or leading movement by the barrier arm 116. In some embodiments, the barrier arm 116 still appears as a standard barrier arm 16 in accordance with the prior art (see FIG. 1) as the vehicle 12 approaches, maintain existing familiarity. Accordingly, the barrier system 110 in accordance with the teachings of the present disclosure may advantageously provide improved visibility, and an overall improved driving experience, to the driver of the vehicle 12.

In addition, because the barrier arm 116 extends upwardly by the slope angle $\beta$ when moved to the raised position 122, for a given length L, the raised height $H_2$ above the travel surface 11 is substantially less than the raised height $H_1$ of the conventional barrier arm 16 (for the same length L) of the prior art barrier system 10 (see FIG. 1). Therefore, with an appropriate slope angle $\beta$, the barrier arm 116 having an appropriate length L that is suitable to obstruct movement of the vehicle 12 when placed in the lowered position 120, will require considerably less height when moved into the raised position 122, and can still be below a ceiling when moved into the raised position 122. Accordingly, the barrier system 110 in accordance with the teachings of the present disclosure may advantageously provide improve fit or improved performance within covered or confined areas in comparison with conventional barrier systems.

a. Barrier Arm

As noted above, in at least some embodiments, the vehicle barrier system 110 includes a barrier arm 116. In some implementations, the barrier arm 116 is an elongated bar or beam member that extends at least partially across the travel path 15 of the vehicle 12. As shown in the accompanying figures, the barrier arm 116 may generally comprise an elongated member such as a pole, rod, post, beam, or the like, and may be a solid or hollow structure. In some embodiments, the barrier arm 116 is supported in a cantilevered configuration, extending outwardly from the main support 114.

The barrier arm 116 may be constructed with a traditional method (e.g. wood, metal, etc.) or may include more advanced light weight materials, such as composite materials including carbon fiber-containing materials or fiber glass. A light weight material may have the benefit of reducing the structural strength required for the actuator assembly 118 and overall mounting (e.g. main support 114), but is not essential.

It will be appreciated that the barrier arm 116 may be configured in a variety of suitable ways, and is not limited to the particular embodiments shown in the accompanying figures. In other embodiments, for example, the barrier arm 116 may include supports or other additional structures that assist in positioning and supporting the functionalities of the barrier arm 116. More specifically, in some embodiments, the barrier arm 116 may include other structures, such as a gate or other framework, and may also include a sign (e.g. "Stop" sign), placard, light, reflector, or other visual indicators.

b. Main Support

In at least some embodiments, the vehicle barrier system 110 includes a main support that supports the actuator assembly 118 and the barrier arm 116. The main support 114 may be a pole, post, bollard, or other similar structure that projects upwardly away from a travel surface 11. In some embodiments, as shown in FIGS. 4-7, the main support 114 may be attached to a support surface 111 (e.g. curb, median, etc.) that is positioned proximate to the travel surface 11, however, it will be appreciated that in other embodiments, the support surface 111 may simply be a portion of the travel surface 11. In the embodiment shown in FIGS. 3-6, the support surface 111 is parallel with, and slightly raised above, the travel surface 11.

Figure 4:
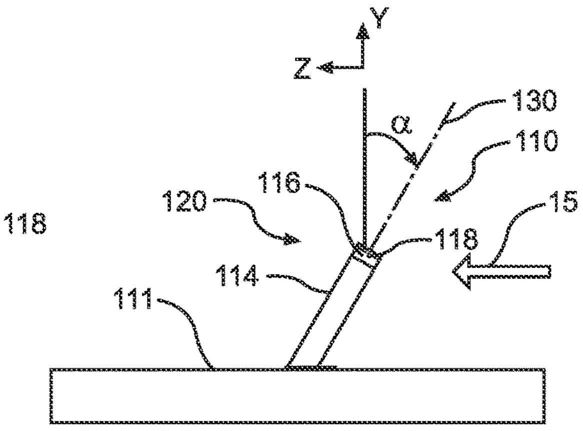
FIG. 4 is a side elevational view of the vehicle barrier system of FIG. 2 in the lowered position as viewed along a negative x axis in accordance with an example embodiment.
Figure 7:
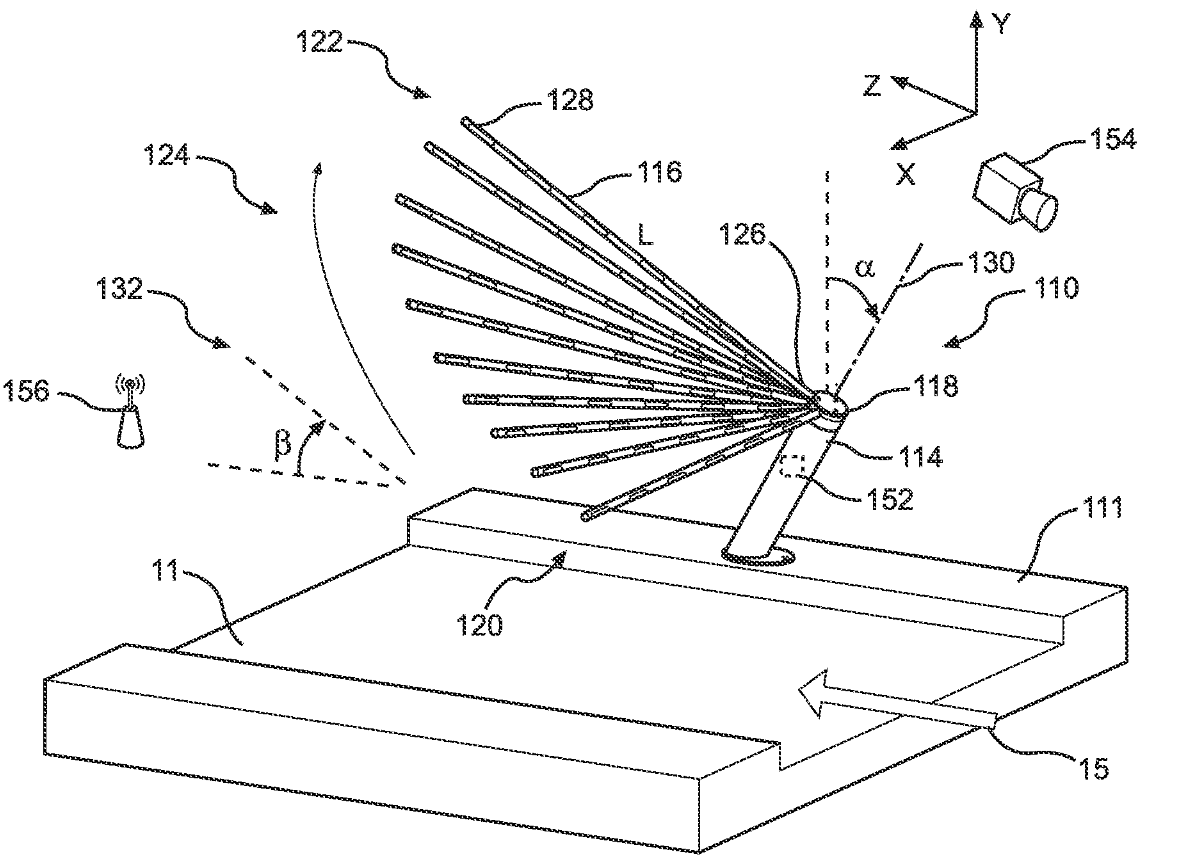
FIG. 7 is another perspective view of the vehicle barrier system of FIG. 2 with the barrier arm in a series of positions from the lowered position to the raised position in accordance with an example embodiment.

As best shown in FIGS. 4 and 6, in some embodiments, the main support 114 is tilted by a tilt angle α. More specifically, the tilt angle α is the angle of the main support 114 with respect to a local normal to the travel surface 11 (which for a horizontal travel surface 11 is the vertical direction). The main support 114 projects away from the travel surface 11 in a non-normal (or non-vertical) direction, and tilts in a direction opposite to the travel path 15 of the vehicle 12 at the tilt angle α (with respect to normal). In some embodiments, the actuator assembly 118 is attached to the main support 114 and is configured such that the axis of rotation 130 extends along an axis of the main support 114, and therefore, the axis of rotation 130 also tilts at the tilt angle α (FIGS. 4, 6, and 7).

It will be appreciated that the main support 114 may be configured in a variety of suitable ways, and is not limited to the particular embodiments shown in the accompanying figures. For example, although the main support 114 is shown as being located on the right side of the travel path 15 of the vehicle 12, in some embodiments, the main support 114 may be located on the left side of the travel path 15. In addition, the main support 114 may be tilted in a forward direction along the travel path 15 (rather than in a direction opposite from the travel path 15 as shown in FIGS. 2-7). In some other embodiments, the barrier system 110 may be wall-mounted such that the main support 116 projects outwardly from a nearby wall, or the barrier system 110 may even be ceiling-mounted (or other overhead support structure) such that the main support 116 projects downwardly from a ceiling (or other overhead support structure) disposed above the travel surface 11.

c. Actuator Assembly

As noted above, the vehicle barrier system 110 includes an actuator assembly 118 coupled to the main support 114 and to the proximal end 126 of the barrier arm 116. In some embodiments, the actuator assembly 118 is coupled to a top portion of the main support 114, and is configured to selectively move the barrier arm 116 from the lowered position 120 to the raised position 122 such that the distal end 128 of the barrier arm 116 moves through an arc of movement 124 that extends both upwardly away from the travel path 15 and laterally along the travel path 15 in a direction away from the vehicle 12.

Generally, the actuator assembly 118 may be configured in a wide variety of suitable configurations using known components, including one or more of electrical motors, gears, bearings, linear actuators, drive belts, pulleys, solenoids, pistons, switches, transceivers, or other suitable components. In some embodiments, the actuator assembly 118 may generally be configured to selectively move the barrier arm 116 between the lowered position 120 and the raised position 122 (and vice versa) in response to one or more command signals from a control unit 152 of a control system 150.

Figure 8:
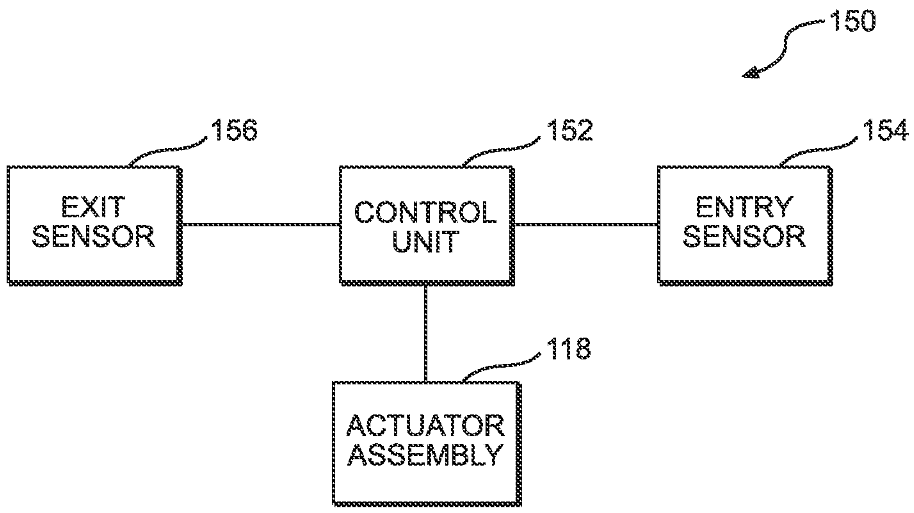
FIG. 8 is a schematic diagram of a control system of the vehicle barrier system of FIG. 7 in accordance with an example embodiment.

For example, FIG. 8 shows a schematic diagram of a control system 150 that may be used to selectively control the actuator assembly 118 of the vehicle barrier system 110 of FIGS. 2-7. In at least some embodiments, a control unit 152 is operatively coupled to, and provides control signals to, the actuator assembly 118. An entry sensor 154 may be operatively coupled to the control unit 152, and may configured to detect an arrival of the vehicle 12 at the vehicle barrier system 110, and may transmit a signal to the control unit 152 to indicate that the vehicle 12 has arrived. In some embodiments, the entry sensor 154 may be configured to detect whether the vehicle 12 is authorized to pass through the vehicle barrier system 110. In response, the control unit 152 may send a signal to the actuator assembly 118 to cause the actuator assembly 118 to move the barrier arm 116 from the lowered position 120 to the raised position 122. Similarly, an exit sensor 156 may be operatively coupled to the control unit 152, and may transmit a signal to the control unit 152 indicating that the vehicle 12 has passed the vehicle barrier system 110. In response, the control unit 152 may send a signal to the actuator assembly 118 to cause the actuator assembly 118 to move the barrier arm 116 from the raised position 122 to the lowered position 120.

As best shown in FIG. 6, in some embodiments, the actuator assembly 118 is configured to rotate the barrier arm 116 into the raised position 122 such that the barrier arm 116 extends at a slope angle β with respect to the travel surface 11 (or the travel path 15 of the vehicle 12). Moreover, in some embodiments, the slope angle β of the barrier arm 116 in the raised position 122 may be equal to (or approximately equal to) the tilt angle α of the main support 114.

In other words, as best shown in FIG. 7, the actuator assembly 118 may be configured to rotate the distal end 128 of the barrier arm 116 from the lowered position 120 through the arc of movement 124 to the raised position 122, wherein the arc of movement 124 lies within a movement plane 132 (indicated by dotted line 132 in FIG. 7) that is sloped upwardly with respect to the travel surface 11 by the slope angle β. In some exemplary embodiments, the slope angle β of the movement plane 132 that contains the arc of movement 124 of the barrier arm 116 is equal to (or at least approximately equal to) the tilt angle α of the main support 114.

Of course, in alternate embodiments, the actuator assembly 118 may be configured such that the distal end 128 of the barrier arm 116 moves through an arc of movement 124, but wherein the arc of movement 124 is not confined within a movement plane 132, or wherein the arc of movement 124 is confined within the movement plane 132, but the slope angle β is not equal to the tilt angle α.

To further facilitate an understanding of the movement of the barrier arm 116 of the vehicle barrier system 110, a cartesian coordinate system is depicted in FIGS. 2-7. In at least some embodiments, if the travel path 15 is aligned with (or parallel to) a z axis of the cartesian coordinate system, the actuator assembly 118 may be operable to rotate the barrier arm 116 about the axis of rotation 130 that lies in a y-z plane of the cartesian coordinate system, wherein the axis of rotation 130 is tilted in a direction opposite from the travel path and forming the tilt angle α with a y axis of the cartesian coordinate system. In some embodiments, the actuator assembly 118 is configured to move the barrier arm 116 such that the arc of movement 124 of the distal end 128 of the barrier arm 116 lies within the movement plane 132 that is angled upwardly by the slope angle β with respect to the travel path 15.

d. Control Unit

Figure 9:
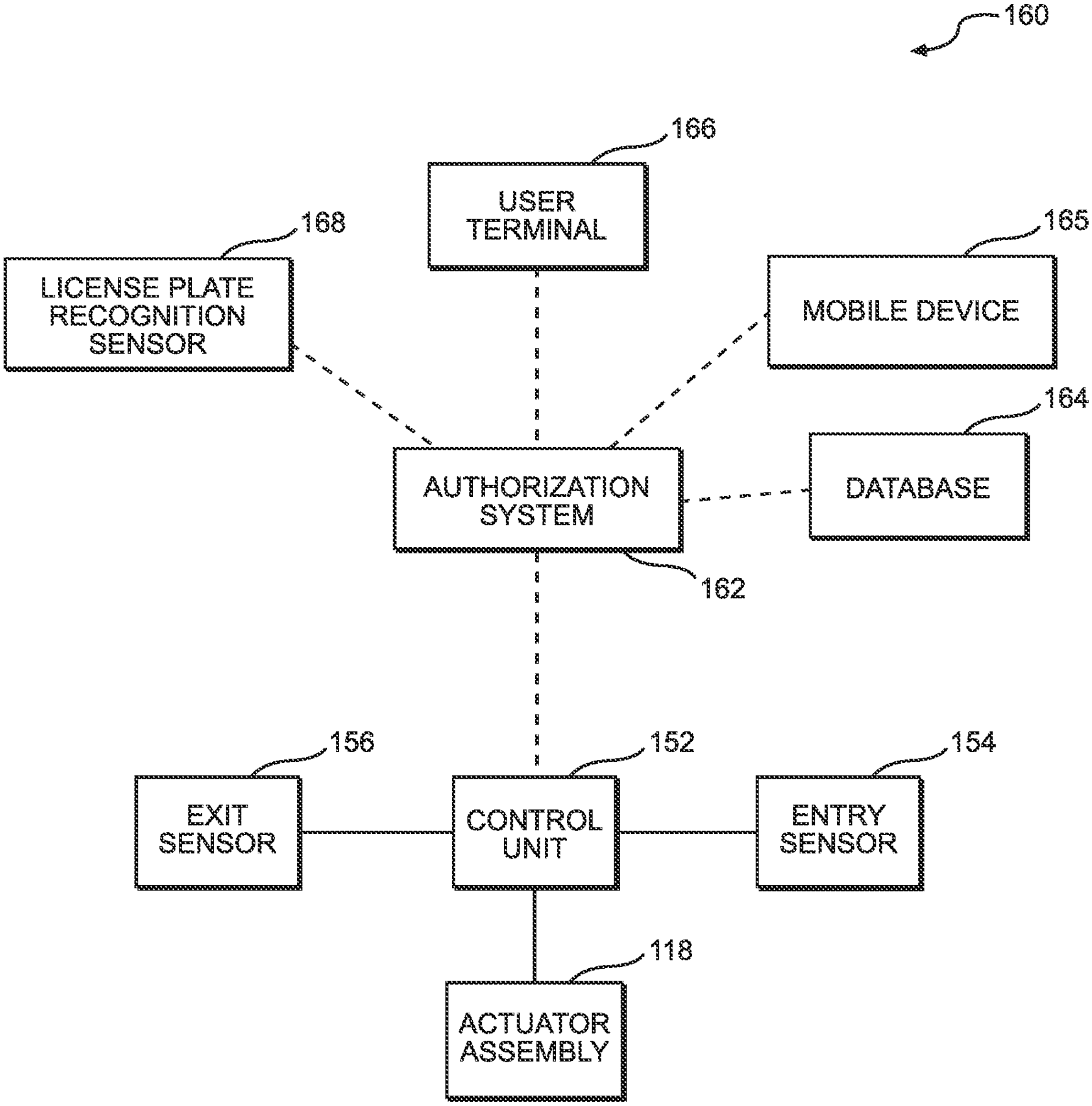
FIG. 9 is a schematic diagram of a control system of the vehicle barrier system of FIG. 7 in accordance with another example embodiment.

As best shown in FIGS. 7-9, the control unit 152 may be utilized to control the actuator assembly 118 and thus control the position of the barrier arm 116. The control unit 152 is generally in communication with the actuator assembly 118 so as to control the actuator assembly 118. In some embodiments, the control unit 152 may be disposed within the main support 114, while in other embodiments, the control unit 152 may be integrated with the actuator assembly 118, may be directly connected to the actuator assembly 118 (e.g., through the use of cables, wires, leads, etc.), or may be remotely connected to the actuator assembly 118 (e.g., through the use of wireless communications such as radio frequency waves, Wi-Fi, and the like).

The control unit 152 may comprise a computing device such as a computer, microcontroller, programmable logic circuit, integrated circuit, or the like. The control unit 152 may be positioned off-site or may be positioned on-site with the other components of the vehicle barrier system 110. As noted above, in various embodiments, the control unit 152 may be in contact or integral with the actuator assembly 118, or may be distally positioned away from the actuator assembly 118. In embodiments utilizing multiple vehicle barrier systems 110 and multiple barrier arms 116, a single control unit 152 may control all of the actuator assemblies 118, or each actuator assembly 118 may have its own control unit 152.

In another exemplary embodiment, the control unit 152 may be integrated with or in communication with (e.g., communicatively interconnected with) an authorization system 162 that provides authority for vehicles to pass, that may include an interface such as a user terminal 166, either directly or via a greater system. For example, as shown in FIG. 9, in some embodiments, a control system 160 includes an authorization system 162 operatively coupled to the control unit 152, and a user terminal 166 is operatively coupled to the authorization system 162. The authorization system 162 may be integrated into the user terminal 166 or stand alone. In some embodiments, the authorization system 162 may comprise a computing device or system including a processor and memory capable of processing data from interconnected sensors, which may include one or more of entry and exit sensors 154, 156, a license plate recognition sensor 168, the user terminals 166, or other suitable sensors (e.g. a device that senses a user's mobile device 165). In some embodiments, the authorization system 162 may receive information from one or more of the sensors (e.g. identification information, payment confirmation, etc.) of the control system 160, and then access a database 164 to determine whether the vehicle 12 is authorized to pass through the vehicle barrier system 110.

In response to a signal from the authorization system 162 indicating that the vehicle 12 is authorized to pass through the vehicle barrier system 110, the control unit 152 may send a signal to the actuator assembly 118 to cause the actuator assembly 118 to move the barrier arm 116 from the lowered position 120 to the raised position 122. Similarly, in response to a signal from the exit sensor 156 indicating that the vehicle 12 has passed the vehicle barrier system 110, the control unit 152 may send a signal to the actuator assembly 118 to cause the actuator assembly 118 to move the barrier arm 116 from the raised position 122 to the lowered position 120.

As shown in FIG. 9, a license plate recognition device 168 may be utilized in which the authorization system 162 is adapted to authorize passage, and thus direct the barrier system 110 to open, upon detection of an authorized license plate or other identifying feature on the vehicle 12 approaching the barrier system 110. Generally, the license plate recognition device 168 may be configured in a wide variety of suitable configurations using known components, including one or more of cameras, programmable devices, integrated circuits, or other suitable circuitry and components configured to perform detection and recognition functionalities. In some embodiments, the license plate recognition device 168 may be integrated with the entry sensor 154.

Additionally or alternatively, the user terminal 166 may be utilized as previously discussed, in which a user may enter information (e.g., an access code), provide payment (e.g., through use of a credit card or mobile device 165), show evidence of authorization (e.g., through use of an RFID card or badge), or the like. The user terminal 166 may comprise various types of scanners or readers known in the art to control access to an area, such as but not limited to a card reader. For example, the user terminal 166 may comprise a free-standing structure including a scanner configured to read a payment card (e.g., a or debit card), an RFID access card or badge, a touch screen user interface panel (e.g., through which a user may enter an access code), and the like. In some embodiments, a user's mobile device 165 (e.g. cell phone, computing device, personal assistant device, etc.) may be used, such as, for example, by scanning a driver's mobile device 165 with the user terminal 166, or by receiving a signal from the mobile device 165 located within the vehicle 12, or by other suitable means.

With continued to reference FIG. 9, it can be seen that the database 164 may be in communication with the authorization system 162. The database 164 may be integrated with the authorization system 162, or the authorization may be in communication with a remote database 164 (e.g., through the cloud). The database 164 may store various information needed for use by the authorization system 162 such as, for example, a listing of license plates that are authorized to pass through the barrier system 110.

When the authorization system 162 successfully verifies a payment, an entered access code, or other methods of authorization/verification, the authorization system 162 directs the control unit 152 to activate the actuator assembly 118 to raise the barrier arm 116 into the raised position 122. Upon an indication that the vehicle 12 has departed (e.g., if the vehicle 12 has been sensed by the exit sensor 156 as having passed through), or alternately, after a certain amount of time, the control unit 152 may again activate the actuator assembly to lower the barrier arm 116 back into the lowered position 120.

In some embodiments, a user may use a mobile device 165 such as a smart phone, smart watch, tablet, computer, or the like, to transmit a signal to the control unit 152 (directly or indirectly via the authorization system 162) to prove authorization of their vehicle 12 to pass. In other embodiments, the user may be directed to enter their license plate information, either via a user terminal 166 or via the user's mobile device 165.

e. Sensors

As noted above, in some exemplary embodiments such as shown in FIGS. 7-9, one or more sensors 154, 156, 168 may be utilized to automatically detect a vehicle 12 approaching or departing the barrier system 110. Any such sensors 154, 156, 168 will generally be in communication with the control unit 152 through either a direct connection or an indirect connection. Such sensors 154, 156, 168 may aid the control unit 152 with operational timing of the barrier arm 116 in the case of an external authorization input (e.g., use of a user terminal 168). However, in certain embodiments or situations, external authorization may not be required at all. In such cases, the control unit 152 may direct the barrier arm 116 to be opened upon the entry sensor 154 detecting a vehicle 12 approaching without the need for any specific authorization. In such embodiments, the authorization system 162 and other components of the control system 160 (e.g. license plate recognition device 168) may be omitted or disabled as-needed.

In a first exemplary embodiment, a single sensor may be utilized for both detecting arriving and departing vehicles 12. In other exemplary embodiments, an entry sensor 154 may be utilized for detecting arriving vehicles 12 and an exit sensor 156 may be utilized for detecting departing vehicles 12.

The one or more sensors 154, 156, 168 will generally be positioned above the roadway 16 in an overhead position such as shown in FIG. 7. Previously, such sensors 154, 156, 168 have instead been positioned on the travel surface 11, or next to the travel surface 11. By positioning the sensors 154, 156, 168 in an overhead position, inadvertent damage may be avoided, such as in the case of vehicles 12 crashing into sensors 154, 156, 168 which are positioned on or near the travel surface 11. In some alternate embodiments, however, the one or more of the sensors may be embedded within the travel surface 11, such as to detect a pressure caused by the weight of approaching or departing vehicle 12.

Generally, one or more of the sensors 154, 156, 168 may be connected to a ceiling 17 above the travel surface 11, or to a wall proximate the travel surface 11, or any other suitable location. In some embodiments, one or more of the sensors 154, 156, 168 may be connected to the main support 114, or to some other pole, support stand, overhead support structure, or other dedicated support means. The sensors 154, 156, 168 will generally be in communication with (e.g., communicatively interconnected with) the control unit 152 so as to communicate to the control unit 152 when a vehicle 12 is detected approaching or departing the barrier system 110.

The positioning and orientation of the sensors 154, 156, 168 may vary in different embodiments. In some embodiments, the sensors 154, 156, 168 may be oriented downwardly (e.g., vertically). In other embodiments, the sensors 154, 156, 168 may be oriented at a downward angle (e.g., diagonally). The sensors 154, 156, 168 may be positioned adjacent to the main support 114 or be connected to the main support 114, or other structures/devices of the barrier system 110.

The sensors 154, 156, 168 may in other embodiments be distally positioned away from the barrier system 110, such as on a ceiling or on an overhead support structure. In the embodiment shown in FIG. 7, it can be seen that the entry sensor 154 (and license plate recognition sensor 168) may be positioned above the travel surface 11 on a first side of the barrier arm 116 and that the exit sensor 156 is positioned above the travel surface 11 on a second side of the barrier arm 116. Various other positioning of the sensors 154, 156, 168 may be utilized.

While the figures illustrate discrete entry and exit sensors 154, 156, 168, it will be appreciated that in some embodiments, a single sensor may be utilized to perform the required functions. Such a single sensor would be oriented to cover both the travel surface 11 approaching the barrier system 110 and the travel surface 11 departing the barrier system 110.

Various types of sensors 154, 156, 168 may be utilized to achieve the sensing objectives, including binary sensors, "shape" sensors configured to detect shapes resembling vehicles, ranging sensors, and the like. In some embodiments, LIDAR sensors may be utilized.

Binary sensors may simply trigger an on or off output (to the control unit 152) when a corresponding or tuned element is within the sensitivity range of the specific sensor (e.g. entry and exit sensors 154, 156). A non-limiting example of a binary sensor may comprise an induction loop that sets an output when the vehicle 12 has approached the induction loop. Other binary sensors could include reflected light or magnetic-based proximity sensors, as well as broken light beam type sensors, (e.g. photodiodes, photodetectors, etc.).

"Shape" sensors may be configured to recognize the shape of objects within the scope of the sensor. For example, in some embodiments, a camera with appropriate image processing may be used to recognize objects as such a "shape" sensor. Other technologies with comparable outcomes may include radar imaging or point cloud imaging, which use multiple distance readings to form an image for further processing. All such "shape" sensors, either individually or used in conjunction with other sensing elements, may be utilized to achieve the sensing objectives of an exemplary embodiment of the vehicle barrier system 110. Such sensors may also provide the added functionality of detecting or recognizing obstructions to the barrier arm 116 (e.g., if a person was in the path of the barrier arm 116).

Ranging sensors may utilize distance measurements and provide an output to the control unit 152 that reflects that distance. Such ranging sensors may include, without limitation, ultrasonic or light-based sensors (e.g., infrared, LIDAR, and the like). A singular ranging sensor, mounted overhead oriented on an angle down on the travel path 15 of vehicle 12 could be used to detect the vehicle 12 position based on a simple calculation of distance readings and the known position of the barrier arm 116 relative to the location of the sensor. Other embodiments could utilize a pair of ranging sensors (e.g., LIDAR-based sensors), in a more vertical orientation, with the entry sensor 154 positioned before the barrier arm 116 and the exit sensor 156 positioned after the barrier arm 116.

In some embodiments, the entry sensor 154 (and possibly the exit sensor 156) may be configured to perform license plate recognition in addition to the role of aiding operation and control of the barrier arm 116. Thus, as noted above, in some embodiments, the license plate recognition sensor 168 may be integrated with the entry sensor 154. Such license plate recognition may be integrated into one or more of the sensors 154, 156, or may utilize one or more separate, stand-alone sensors. An exemplary embodiment of one or more sensors 154, 156 which allow for license plate recognition is shown and described in U.S. Patent Publication No. 2021/0264779, covering a "Vehicle Identification System", the entire disclosure of which, except for any definitions, disclaimers, disavowals, and inconsistencies, is incorporated herein by reference.

In such embodiments, one or more of the sensors 154, 156 may comprise imaging devices such as cameras or the like which are adapted to detect not only the vehicle, but to also detect and identify the license plate (or other identifying characteristics) or each vehicle 12 approaching the barrier arm 116. If the one or more of the sensors 154, 156 detects a license plate or other identifying characteristic that confirms authorization of the vehicle 12 to pass, the control unit 152 will direct the actuator assembly 118 to raise the barrier arm 116 so that the vehicle 12 may pass.

In certain embodiments, separate authorization (e.g., through license plate recognition sensor 168 or the like) may be omitted or disabled. In such embodiments, any vehicle 12 approaching the barrier arm 116 may be permitted to pass without any separate authorization or payment. For example, the entry sensor 154 may simply function to raise the barrier arm 116 when the vehicle 12 approaches, and the exit sensor 156 may function to lower the barrier arm 116 when the vehicle 12 departs (or after a set period of time). In other embodiments, the barrier arm 116 may function without the need for sensors 154, 156 at all. In such embodiments, a push button, such as incorporated into the user terminal 166, may be utilized to raise the barrier arm 116, with the barrier arm 116 lowering itself after a preset amount of time sufficient to allow the vehicle 12 to pass.

f. Alternate Embodiments

Figure 10:
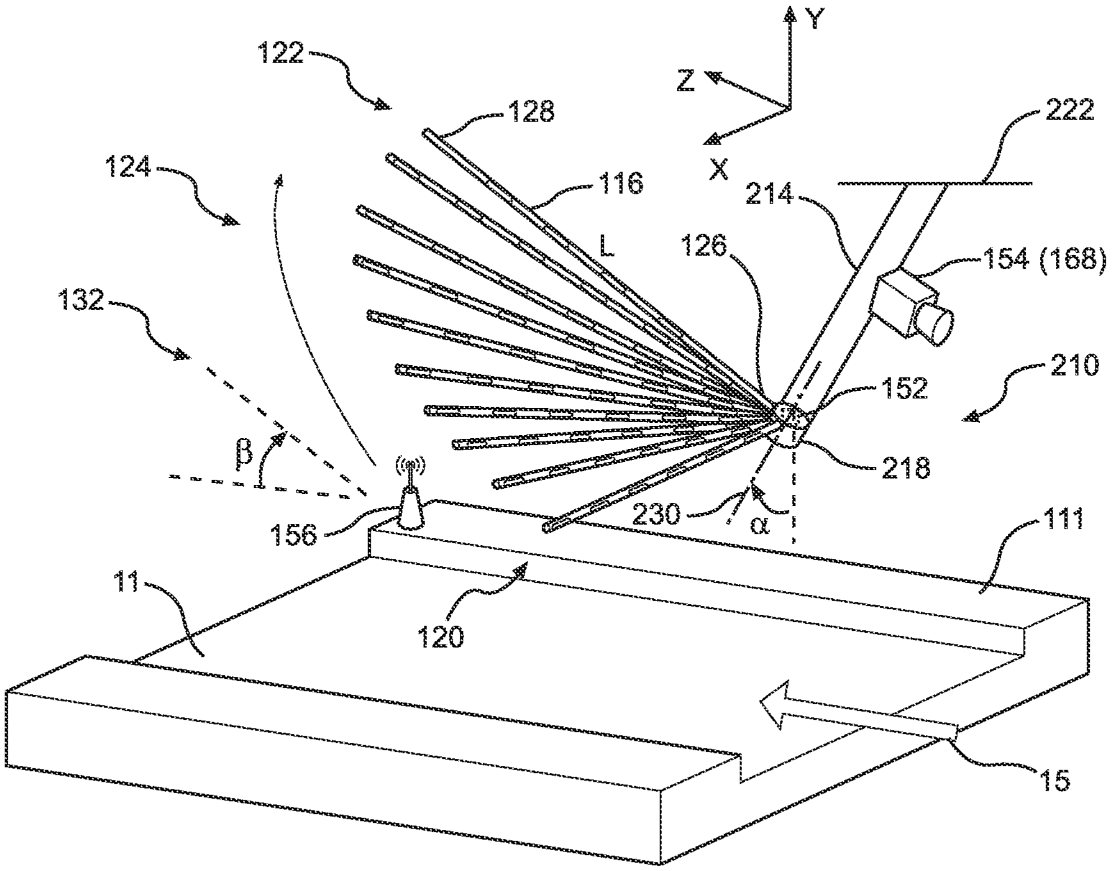
FIG. 10 is a perspective view of a vehicle barrier system having a vertical support structure in accordance with another example embodiment.
Figure 11:
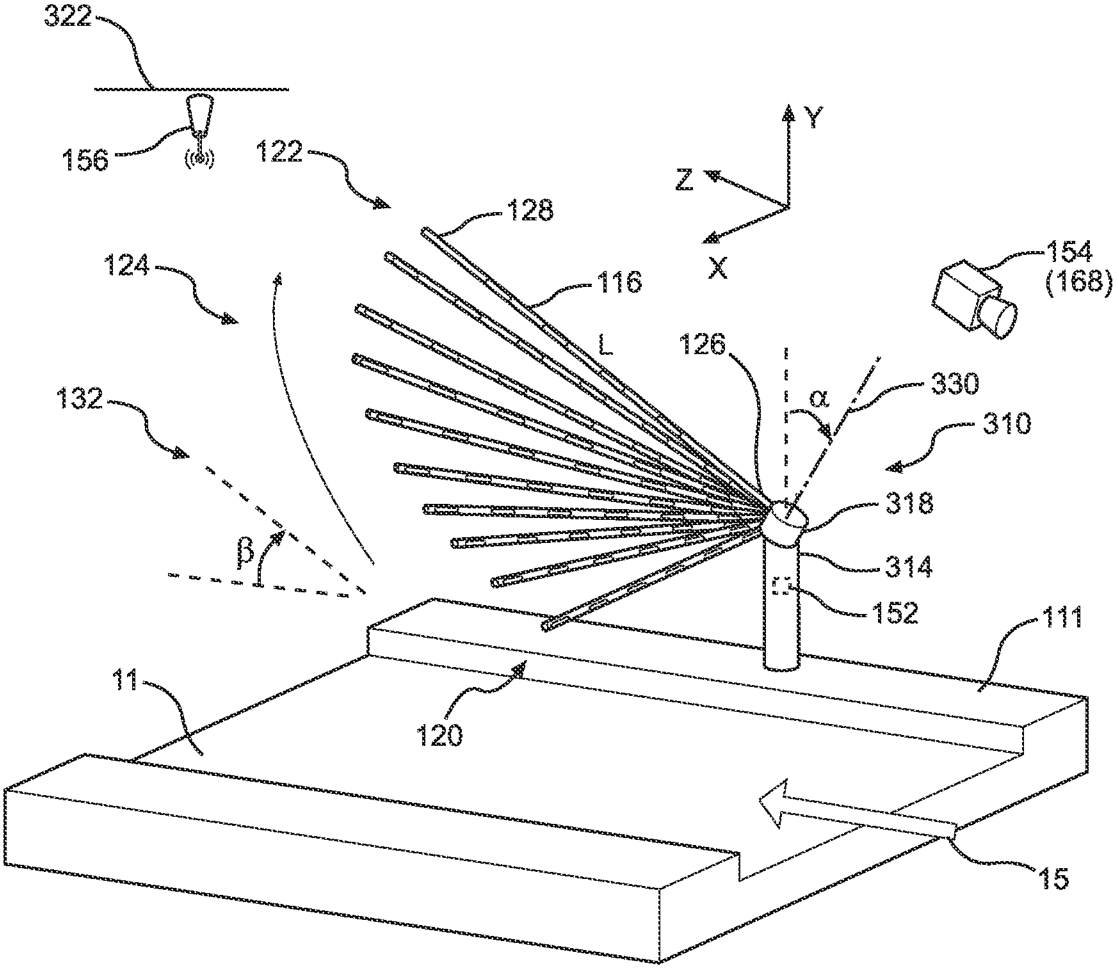
FIG. 11 is a perspective view of a vehicle barrier system having a support structure projecting downwardly from a ceiling in accordance with another example embodiment.

FIGS. 10-18 illustrate various alternate embodiments of the vehicle barrier systems in accordance with the present disclosure. For example, FIGS. 10 and 11 show vehicle barrier systems having different embodiments of main supports in accordance with the present disclosure. In addition, FIGS. 12-18 show a vehicle barrier system having a breakaway assembly in accordance with the present disclosure.

In the following discussion of alternate embodiments, the vehicle barrier systems may include many of the same (or substantially similar) components as described above. Therefore, the same reference numerals may be used to refer to the same (or substantially similar) components. For the sake of brevity, in the following discussion of alternate embodiments, the discussion will focus primarily on different features or aspects between such alternate embodiments and the previously-described embodiments. Components that are the same as (or substantially similar to) those described above will not be described in detail again.

FIG. 10 is a perspective view of a barrier system 210 in accordance with another example embodiment. In this embodiment, the barrier system 210 includes a main support 214 that projects downwardly from a ceiling (or other overhead support structure) 222. An actuator assembly 218 is attached to the main support 214 that movably supports the barrier arm 116. More specifically, the actuator assembly 218 is coupled to the proximal end 126 of the barrier arm 116, and is configured to rotate the barrier arm 116 about an axis of rotation 230, moving the barrier arm 116 from the lowered position 120 to the raised position 122 such that the distal end 128 of the barrier arm 116 moves through an arc of movement 124. The axis of rotation 230 of the actuator assembly 218 is tilted with respect to vertical (or local normal to the travel surface 11) by a tilt angle $\alpha$.

It will be appreciated that, although the main support 214 projects downwardly, the actuator assembly 218 is configured such that the axis of rotation 230 is tilted with respect to vertical (or local normal to the travel surface 11) by the tilt angle $\alpha$. In some embodiments, as shown in FIG. 10, the axis of rotation 230 is tilted in a direction along the travel path. More specifically, in some embodiments, the axis of rotation 230 lies in the y-z plane of a cartesian coordinate system, and is angled with respect to the y axis of the cartesian coordinate system by the tilt angle $\alpha$.

As shown in FIG. 10, the actuator assembly 218 is coupled to a lower end portion of the main support 214, and is configured to selectively move the barrier arm 116 from the lowered position 120 to the raised position 122 in a "leading" movement such that the distal end 128 of the barrier arm 116 moves through an arc of movement 124 that extends both upwardly away from the travel path 15 and laterally along the travel path 15 in a direction away from the vehicle 12. In some embodiments, the arc of movement 124 lies within the movement plane 132 that slopes with respect to the travel path 15 of the vehicle 12 (or the travel surface 11) by the slope angle $\beta$. Moreover, in some embodiments, the slope angle $\beta$ of the movement plane 132 may be equal to (or approximately equal to) the tilt angle $\alpha$ of the axis of rotation 230.

To illustrate that the entry sensor 154 (and license plate recognition device 168) may be positioned in other suitable locations, in the embodiment shown in FIG. 10, the entry sensor 154 (and license plate recognition device 168) are shown as being integrated into a single device and attached to the main support 214 of the barrier system 210. Similarly, to illustrate that the control unit 152 may be positioned in other suitable locations, in the embodiment shown in FIG. 10, the control unit 152 is located within the actuator assembly 218.

It will be appreciated that embodiments of barrier systems 210 as depicted in FIG. 10 may provide the above-noted advantages of "leading" the driver of the vehicle 12 through the barrier system 210 in a sweeping or leading movement by the barrier arm 116, while using a main support 214 that projects downwardly from a ceiling (or support structure) 222. In other words, the ceiling 222 has become a support surface for the main support 214. Such embodiments may be desirable in certain environments, such as covered or enclosed areas, thereby providing the above-described advantages of improved fit of the barrier arm 116 within a covered area, improved visibility of the barrier arm 116 during movement between the lowered and raised positions 120, 122, and an overall improved driving experience to the driver of the vehicle 12.

FIG. 11 is a perspective view of a vehicle barrier system 310 in accordance with another example embodiment. In this embodiment, the barrier system 310 includes a main support 314 (e.g. post, bollard, etc.) that projects vertically upwardly away from the support surface 111, and an actuator assembly 318 attached to the main support 314 that movably supports the barrier arm 116. More specifically, the actuator assembly 318 is coupled to the proximal end 126 of the barrier arm 116, and is configured to rotate the barrier arm 116 about an axis of rotation 330, moving the barrier arm 116 from the lowered position 120 to the raised position 122 such that the distal end 128 of the barrier arm 116 moves through an arc of movement 124. In some embodiments, the exit sensor 156 may be attached to a ceiling (or overhead support structure) 322.

It will be appreciated that, even though the main support 314 extends vertically upwardly from the support surface 111, the axis of rotation 330 of the actuator assembly 318 is tilted with respect to vertical by a tilt angle $\alpha$. Such a configuration may be achieved in various ways, such as by angularly mounting of the actuator assembly 318 onto the main support 314 to achieve the desired tilt angle $\alpha$, or by other suitable methods.

Thus, although the main support 314 projects vertically upwardly, the actuator assembly 318 may be configured such that the axis of rotation 330 is tilted with respect to vertical by a tilt angle $\alpha$. In other words, in some embodiments, the axis of rotation 330 of the actuator assembly 318 is not aligned with a longitudinal axis of the main support 314. In some embodiments, the axis of rotation 330 is tilted in a direction opposite from the travel path. In some embodiments, the axis of rotation 330 lies in the y-z plane of the cartesian coordinate system, and is angled with respect to the y axis of the cartesian coordinate system by the tilt angle α.

As shown in FIG. 11, the actuator assembly 318 is coupled to a top portion of the main support 314, and is configured to selectively move the barrier arm 116 from the lowered position 120 to the raised position 122 such that the distal end 128 of the barrier arm 116 moves through an arc of movement 124 that extends both upwardly away from the travel path 15 and laterally along the travel path 15 in a direction away from the vehicle 12. In some embodiments, the arc of movement 124 lies within the movement plane 132 that slopes with respect to the travel path 15 of the vehicle 12 (or the travel surface 11) by the slope angle β. Moreover, in some embodiments, the slope angle β of the movement plane 132 may be equal to (or approximately equal to) the tilt angle α of the axis of rotation 330.

It will be appreciated that embodiments of barrier systems 310 as depicted in FIG. 11 may provide the above-noted advantages of "leading" the driver of the vehicle 12 through the barrier system 310 in a sweeping or leading movement by the barrier arm 116, while also having a vertical main support 214, such as may be encountered by an operator who wishes to modify or retrofit a conventional barrier system 10 (FIG. 1). In such scenarios, a main support 14 that projects vertically may be retro-fitted with the actuator assembly 318 having an axis of rotation 330 that is tilted with respect to vertical by a tilt angle α, thereby providing the above-described advantages of improved visibility of the barrier arm 116 during movement between the lowered and raised positions 120, 122, improved fit of the barrier arm 116 within a covered area, and an overall improved driving experience to the driver of the vehicle 12.

g. Embodiments Having a Breakaway Assembly

In some embodiments, vehicle barrier systems may be configured to include a breakaway assembly. With the barrier arm 116 subject to collisions with vehicles 12 due to bad drivers, or damage due to other possible causes (e.g. vandalism), in some embodiments, it may be advantageous for the barrier system 110 to include some form of breakaway assembly. It may also be desirable to allow an attendant to manually disengage a breakaway assembly to raise the barrier arm 116 to the raised position 122, such as when the barrier system 110 is not needed or is out of service.

Figure 12:
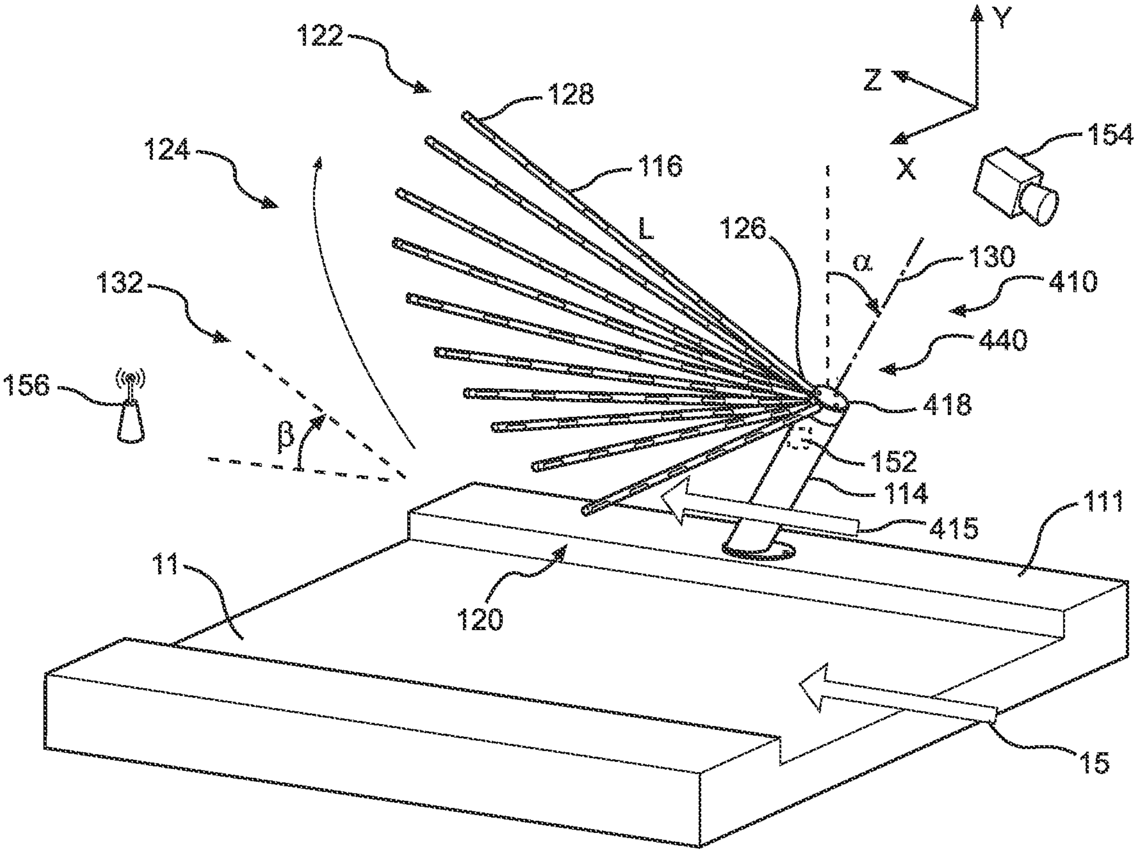
FIG. 12 is a perspective view of a vehicle barrier system having a breakaway assembly in accordance with an example embodiment.

For example, FIG. 12 is a perspective view of a vehicle barrier system 410 having an actuator assembly 418 that includes a breakaway assembly 440 in accordance with an example embodiment. In some embodiments, in normal operations, the actuator assembly 418 moves the barrier arm 116 through an arc of movement 124 that extends both upwardly away from the travel path 15 and laterally along the travel path 15 as described above. If an abnormal force 415 is applied to the barrier arm 116 that exceeds a predetermined threshold, however, the breakaway assembly 440 may advantageously prevent damage to the barrier system 410.

More specifically, in some embodiments, the barrier system 410 includes a main support 114 (e.g. post, bollard, etc.) that projects upwardly away from the support surface 111 (or travel surface 11), and an actuator assembly 418 attached to the main support 114 that movably supports the barrier arm 116. As described above, the actuator assembly 418 is coupled to the proximal end 126 of the barrier arm 116, and may be configured to rotate the barrier arm 116 about an axis of rotation 130, moving the barrier arm 116 from the lowered position 120 to the raised position 122 such that the distal end 128 of the barrier arm 116 moves through an arc of movement 124. In some embodiments, as shown FIG. 12, the axis of rotation 130 of the actuator assembly 418 is tilted with respect to vertical by a tilt angle α.

Figure 13:
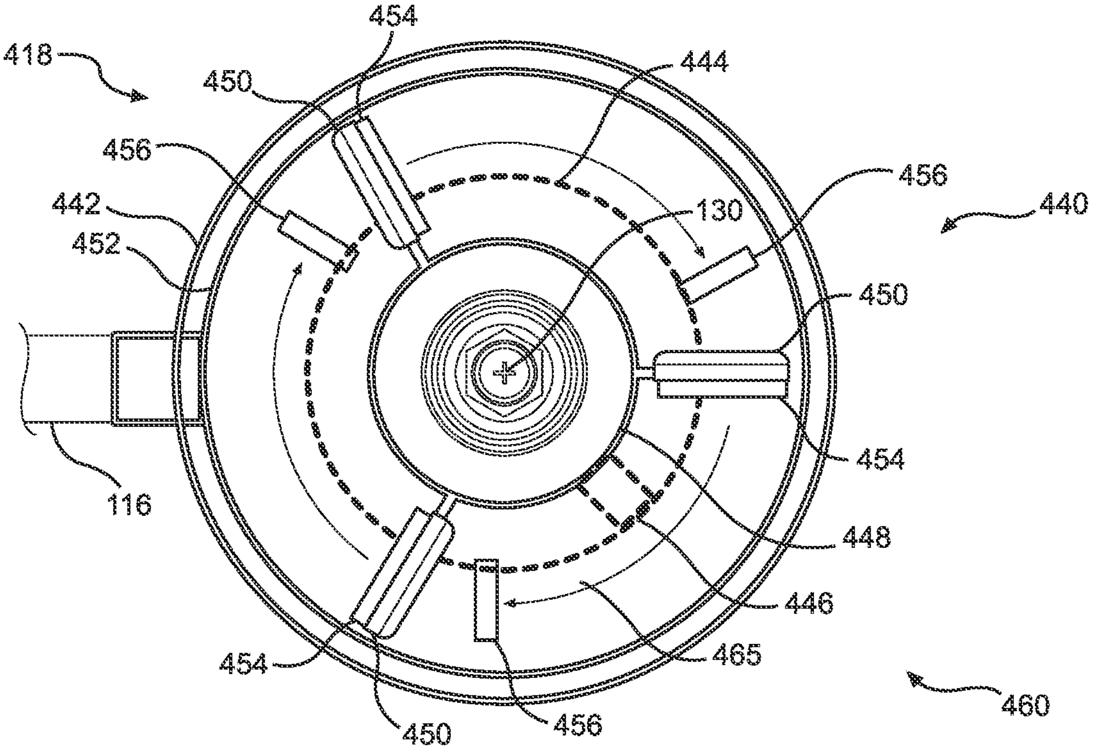
FIG. 13 is a partially cutaway view of an actuator assembly that includes a breakaway assembly viewed from above along an axis of rotation in accordance with an example embodiment.

Additional details of an exemplary embodiment of the breakaway assembly 440 are shown in FIGS. 13-18. For example, FIG. 13 is a partially cutaway view (looking downwardly along the axis of rotation 130) of the actuator assembly 418 that includes the breakaway assembly 440 in accordance with an example embodiment.

In some embodiments, the actuator assembly 418 includes an outer housing 442 that covers and protects internal components of the actuator assembly 418, and a stationary frame 444 that couples the actuator assembly 418 (directly or indirectly) to the main support 114. In FIG. 13, portions of the outer housing 442 have been cutaway to show some of the internal components of the actuator assembly 418. The actuator assembly 418 may further include a drive motor 446 (or other suitable actuation mechanism) that may be coupled to the stationary frame 444, and a drive bracket 448 that is rotatably coupled to the stationary frame 444. The actuator assembly 418 may further include an arm bracket 452 that attaches to the barrier arm 116. The arm bracket 452 is operatively coupled to the drive bracket 448 by the breakaway assembly 440, as described more fully below.

More specifically, the breakaway assembly 440 may be configured to remain engaged during normal operations as the actuator assembly 418 raises the barrier arm 116 from the lowered position 120 to the raised position 122 (FIG. 12). In the event that the barrier arm 116 encounters an abnormal force 415 (e.g. a vehicle strike, vandalism, etc.) that exceeds a predetermined threshold, the breakaway assembly 440 may be configured to become disengaged such that the barrier arm 116 (and arm bracket 452) swings freely through the arc of rotation 124 independently of some of the other components of the actuator assembly 418 (e.g. drive bracket 448, motor 446, etc.). In this way, the breakaway assembly 116 may reduce or prevent breakage of the barrier arm 116 or other components of the actuator assembly 418.

With continued reference to FIG. 13, in some embodiments, the breakaway assembly 440 of the actuator assembly 418 includes one or more drive magnets 450 disposed on the drive bracket 448, and one or more magnetically-attractive elements 454 disposed on the arm bracket 452. In the embodiment shown in FIG. 13, the breakaway assembly 440 includes three drive magnets 450 that are distributed on the drive bracket 448 at three equally-spaced circumferential positions distributed about the axis of rotation 130. Similarly, the breakaway assembly 440 shown in FIG. 13 includes three magnetically-attractive elements 454 coupled to the arm bracket 452. It will be appreciated that in alternate embodiments, a different number of drive magnets 450 and magnetically-attractive elements 454 may be used, and that the spacing and locations of the drive magnets 450 and magnetically-attractive elements 454 may be different from the particular embodiment shown in FIGS. 13-17.

In a first position 460 shown in FIG. 13, each of the drive magnets 450 of the drive bracket 448 is aligned with and magnetically coupled to a corresponding one of the magnetically-attractive elements 454 disposed on the arm bracket 452. In this way, the arm bracket 452 (and thus the barrier arm 116) is magnetically coupled to the drive bracket 448 by the breakaway assembly 440. In some embodiments, the arm bracket 452 can rotate freely of the motor 446 (or other suitable actuator device) about the axis of rotation 130 if allowed by the breakaway assembly 440 (i.e. if disengaged from the drive magnets 450 of the drive bracket 448).

In at least some embodiments, the drive magnets 450 may be relatively strong magnets having a relatively strong attractive force with the magnetically-attractive elements 454 so that, during normal operations, the actuator assembly 418 can move the barrier arm 116 from the lowered position 120 to the raised position 122 without the breakaway assembly 440 becoming disengaged. In other words, during normal operations, the drive magnets 450 on the drive bracket 448 remain magnetically coupled to the magnetically-attractive elements 454 on the arm bracket 452 such that the arm bracket 452 (and barrier arm 116) do not become disengaged from the drive bracket 448.

The strength of the drive magnets 450 may vary from configuration to configuration depending upon a number of variables, such as the number of drive magnets 450, and the predetermined threshold selected for the breakaway to occur. For example, in some embodiments, the predetermined threshold may be selected to avoid damage to the barrier system 410, such that the predetermined threshold represents a value slightly lower than a force needed to break one or more components of the barrier system 410 (e.g. the barrier arm 116, or the actuator assembly 418, etc.). In other embodiments, other criteria may be used to select the predetermined threshold (e.g. to avoid damage to the vehicle 12, to allow an attendant to easily manipulate the barrier arm 116 to manually disengage the breakaway assembly 440 to raise the barrier arm 116 to the raised position 122, etc.). For example, if the barrier arm 116 needs to be raised manually (e.g. in the event of a power failure or other failure of the actuator assembly 418), it may be desirable to allow an attendant to manually force the barrier arm 116 to pivot upwardly, overcoming the magnetic attraction between the drive magnets 450 and the magnetically-attractive elements 454 and raising the barrier arm 116 into the raised position 122.

The drive magnets 450 may be formed of any suitable magnetic materials or selectively magnetic devices. For example, in some embodiments, the drive magnets 450 may be permanent magnets. In other embodiments the drive magnets 450 may be electromagnets that exhibit magnetic properties only when electrical power is provided. In still other embodiments, the drive magnets 450 may be any suitable combination of permanent magnets and electromagnets. Similarly, the magnetically-attractive elements 454 may be formed of any suitable materials that are magnetically attractive or suitably responsive to magnetic fields. For example, in some embodiments, the magnetically-attractive elements 454 may include iron or other ferrous-containing materials, or any other suitable magnetically-attractive material (e.g. nickel, rare earth metals, etc.).

As further shown in FIG. 13, in some embodiments, the actuator assembly 418 may also include three stop magnets 456 that are attached to the stationary frame 444. In the depicted embodiment, the stop magnets 456 are also distributed on the stationary frame 444 at three equally-spaced circumferential positions distributed about the axis of rotation 130. It will be appreciated that in alternate embodiments, a different number of stop magnets 456 may be used, and that the spacing of the stop magnets 456 may be different from the particular configuration shown in FIGS. 13-17.

It will be appreciated that the stop magnets 456 may be relatively weaker magnets, having a relatively weaker attractive force with the magnetically-attractive elements 454 than do the drive magnets 450. More specifically, in some embodiments, the stop magnets 456 may be strong enough to magnetically hold the arm bracket 452 with the barrier arm 116 in the raised position 122, however, the stop magnets 456 are relatively weaker than the drive magnets 450 such that the drive magnets 450 have a stronger magnetic attraction to the magnetically-attractive elements 454, and may pull the magnetically-attractive elements 454 away from the stop magnets 456, as described more fully below.

Similar to the drive magnets 450, the stop magnets 456 may be formed of any suitable magnetic materials or selectively magnetic devices. For example, in some embodiments, the stop magnets 456 may be permanent magnets. In other embodiments the stop magnets 456 may be electromagnets that exhibit magnetic properties only when electrical power is provided. In still other embodiments, the stop magnets 456 may be any suitable combination of permanent magnets and electromagnets.

As noted above, in some embodiments, the actuator assembly 418 is configured to selectively move the barrier arm 116 during normal operations from the lowered position 120 to the raised position 122 in a “leading” movement such that the distal end 128 of the barrier arm 116 moves through an arc of movement 124 that extends both upwardly away from the travel path 15 and laterally along the travel path 15 in a direction away from the vehicle 12, without the arm bracket 452 (and barrier arm 116) becoming disengaged from the drive bracket 448. In such embodiments, the axis of rotation 130 of the actuator assembly 418 may be tilted with respect to vertical by a tilt angle $\alpha$.

In alternate embodiments, however, the actuator assembly 418 having the breakaway assembly 440 may be used in other suitable barrier systems in which the barrier arm 116 moves from a first (or closed/lowered) position into a second (or open/raised) position, wherein the barrier arm 116 remains approximately horizontal during movement. In such barrier systems, the axis of rotation 130 of the actuator assembly 418 shown in FIG. 13 may be a vertical axis (and not tilted by the tilt angle $\alpha$). Thus, it will be appreciated that the breakaway assembly 440 of the present disclosure may be used in a variety of suitable barrier systems, and is not limited to the barrier systems (e.g. barrier system 110) having an axis of rotation 130 that is tilted.

FIGS. 13-17 show the breakaway assembly 440 of the actuator assembly 418 in a series of different positions to facilitate an understanding of the operation of the breakaway assembly 440. For the sake of clarity, however, FIGS. 14-17 primarily show the components of the breakaway assembly 440, while some of the other components of the actuator assembly 418 are intentionally omitted, so that an improved understanding of the operation of the breakaway assembly 440 may be realized.

For example, FIG. 13 shows the actuator assembly 418 in a first position 460, which may correspond to the barrier arm 116 being positioned in the lowered position 120 (FIG. 12). In the first position 460, the breakaway assembly 440 is fully engaged such that the drive magnets 450 on the drive bracket 448 are magnetically coupled with the magnetically-attractive elements 454 on the arm bracket 452. When the motor 446 of the actuator assembly 418 is actuated (e.g. by the control unit 152), the motor 446 begins rotating the drive bracket 448 and the arm bracket 452 in a clockwise direction 465 about the axis of rotation 130, which begins raising the barrier arm 116 through the arc of rotation 124 (FIG. 12).

Figure 14:
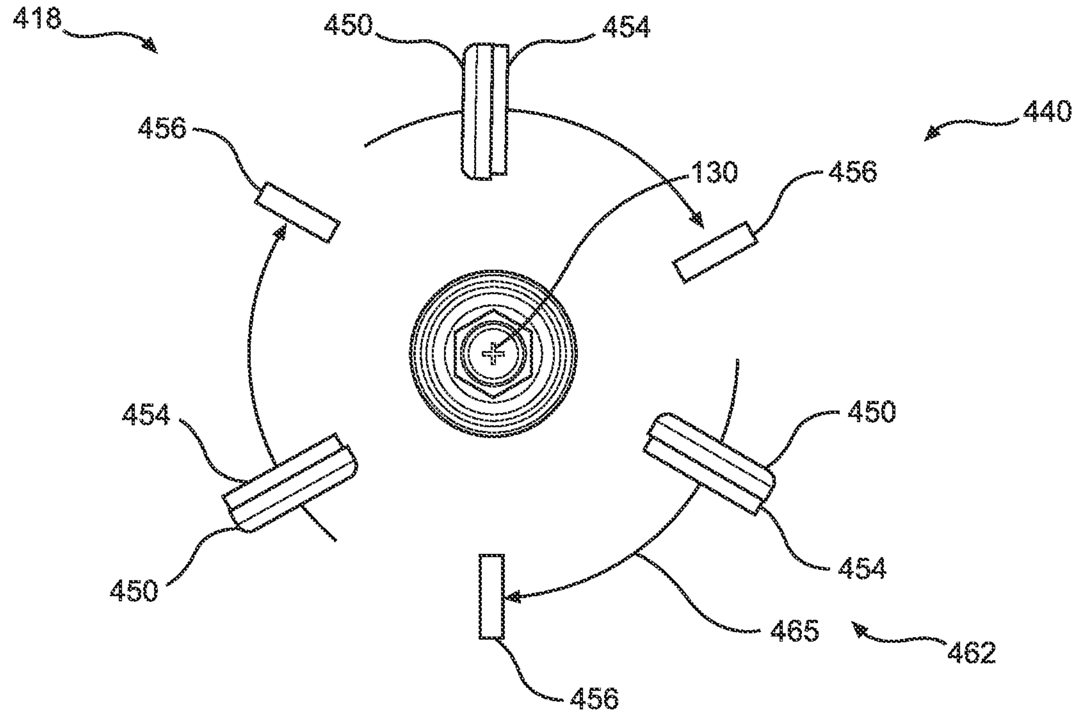
FIG. 14 is a partially cutaway view of the actuator assembly and the breakaway assembly of FIG. 13 in a second position in accordance with an example embodiment.

FIG. 14 shows the actuator assembly 418 in a second position 462. In the second position 462, the drive bracket 448 has continued to rotate the arm bracket 452 in the clockwise direction 465 about the axis of rotation 130, which has continued to raise the barrier arm 116 through the arc of rotation 124. In some embodiments, the second position may correspond to the barrier arm 116 being raised to approximately a midpoint of the arc of rotation 124 between the lowered position 120 and the raised position 124 (FIG. 12). In the second position 462, the breakaway assembly 440 remains fully engaged such that the drive magnets 450 on the drive bracket 448 are magnetically coupled with the magnetically-attractive elements 454 on the arm bracket 452. As the motor 446 continues rotating the drive bracket 448 and the arm bracket 452 in the clockwise direction 465 about the axis of rotation 130, the barrier arm 116 continues to be raised through the arc of rotation 124 (FIG. 12).

Figure 15:
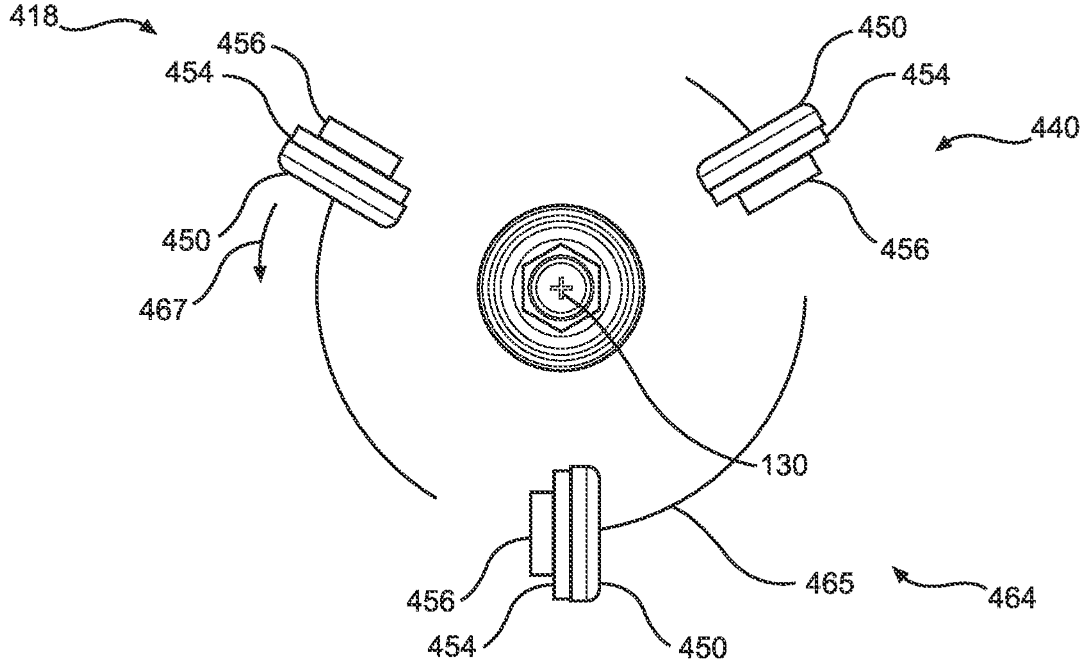
FIG. 15 is a partially cutaway view of the actuator assembly and the breakaway assembly of FIG. 13 in a third position in accordance with an example embodiment.

FIG. 15 shows the actuator assembly 418 in a third position 464. In the third position 464, the drive bracket 448 (and motor 446) has continued to rotate the arm bracket 452 in the clockwise direction 465 about the axis of rotation 130 until the magnetically-attractive elements 454 on the arm bracket 452 have reached the stop magnets 456. In some embodiments, the third position 464 may correspond to the barrier arm 116 being raised to the raised position 124 (FIG. 12). In the third position 464, the breakaway assembly 440 remains fully engaged such that the drive magnets 450 on the drive bracket 448 remain magnetically coupled with the magnetically-attractive elements 454 on the arm bracket 452. Also, in the third position 464, the magnetically-attractive elements 454 may become magnetically engaged with the stop magnets 456 on the stationary frame 444, and the motor 446 may be stopped. The stop magnets 456 may thereby assist in holding the barrier arm in the raised position 122.

After the vehicle 12 successfully passes the barrier system 410, the motor 446 of the actuator assembly 418 may be actuated (e.g. by the control unit 152) to rotate the drive bracket 448 (and the arm bracket 452) in a counter-clockwise direction 467 about the axis of rotation 130. It will be appreciated that because the drive magnets 450 are relatively stronger than the stop magnets 456, the magnetic attraction of the drive magnets 450 with the magnetically-attractive elements 454 is stronger than the weaker magnetic attraction between the stop magnets 456 and the magnetically-attractive elements 454. Accordingly, as the drive bracket 448 is rotated in the counter-clockwise direction 467, the drive magnets are able to exert a greater magnetic force on the magnetically-attractive elements 454 and pull the magnetically-attractive elements 454 away from the stop magnets 456. The motor 446 is therefore free to continue rotating the drive bracket 448 and the arm bracket 452 in the counter-clockwise direction 467 to the first position (FIG. 13), lowering the barrier arm 116 to the lowered position 120 (FIG. 12). Therefore, FIGS. 13-15 show the operation of the breakaway assembly 440, and that the breakaway assembly 440 remains fully engaged as the actuator assembly 418 is actuated (e.g. by control unit 152) to raise the barrier arm 116 during normal operations from the lowered position 120 to the raised position 122, and remains engaged as the actuator assembly 418 is actuated to lower the barrier arm 116 during normal operations from the raised position 122 to the lowered position 120.

Figure 16:
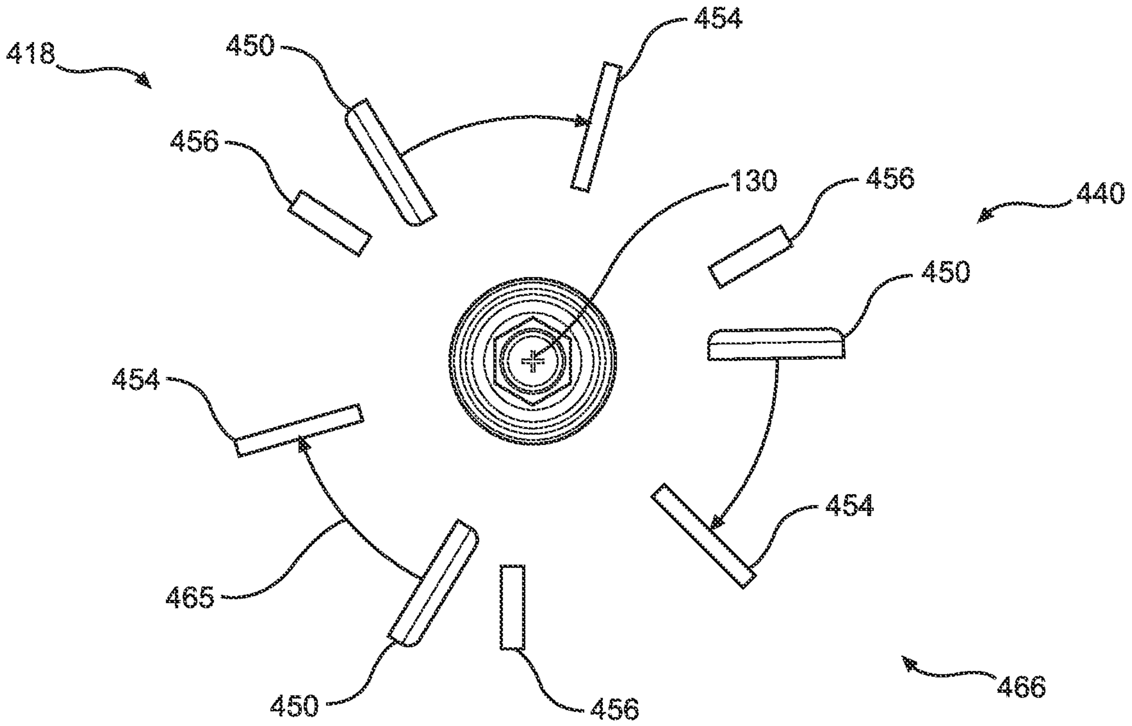
FIG. 16 is a partially cutaway view of the actuator assembly and the breakaway assembly of FIG. 13 in a fourth position in accordance with an example embodiment.

FIG. 16 shows the actuator assembly 418 (and breakaway assembly 440) in a fourth position 466 such as may occur in response to application of the abnormal force 415 on the barrier arm 116 as depicted in FIG. 12. In some embodiments, the abnormal force 415 applied on the barrier arm 116 may be caused by the vehicle 12 pushing on or striking the barrier arm 116, or by a variety of other causes. As shown in FIG. 12, the abnormal force 415 may be aligned with the travel path 15 of the vehicle 12, however, in other embodiments, other abnormal forces may be encountered.

With reference to FIG. 16, in the fourth position 466, the abnormal force 415 applied to the barrier arm 116 has exceeded the predetermined threshold and has caused the breakaway assembly 440 to become disengaged. More specifically, the abnormal force 415 has overcome the magnetic attractive force between the magnetically-attractive elements 454 on the arm bracket 452 and the drive magnets 450 on the drive bracket 448 (FIG. 13), causing the magnetically-attractive elements 454 to disengage from the drive magnets 450. Also, in the fourth position 466, the abnormal force 415 has caused the arm bracket 452 to rotate in the clockwise direction 465 about the axis of rotation 130 so that the magnetically-attractive elements 454 are circumferentially spaced apart from the drive magnets 450 in the clockwise direction 465. The disengagement of the breakaway assembly 440 permits the arm bracket 452 to rotate independently from the drive bracket 448, thereby permitting the barrier arm 116 to be pushed by the abnormal force 415 along the arc of rotation 124 (FIG. 12). Accordingly, in the fourth position 466, the breakaway assembly 440 has disengaged the arm bracket 452 (and the barrier arm 116) from other components of the actuator assembly 418 (i.e. disengaged from the drive bracket 448) in response to the abnormal force 415 acting on the barrier arm 116, allowing the arm bracket 452 to rotate freely of the motor 446 about the axis of rotation 130.

Although the abnormal force 415 is depicted in FIG. 12 as being applied to the barrier arm 116 when the barrier arm 116 is in the lowered position 120, it will be appreciated that the abnormal force 415 may be applied to the barrier arm 116 at any other location of the barrier arm 116 along the arc of movement 124 between the lowered position 120 and the raised position 122 (not including the raised position 122). Therefore, the disengagement (or "breakaway") of the breakaway assembly 440 may occur during any position of the barrier arm 116 prior to reaching the raised position 122 (or third position 464 of FIG. 15).

With continued reference to FIG. 16, the components of the breakaway assembly 440 are shown in the fourth position 466 which, in some embodiments, may correspond to the barrier arm 116 being pushed by the abnormal force 415 to approximately a midpoint of the arc of movement 124 (FIG. 12). If the abnormal force 415 were released, in some embodiments having the axis of rotation 130 tilted away from vertical by the tilt angle $\alpha$, the barrier arm 116 may freely rotate in the counter-clockwise direction 467 back down to the first position 460 (FIG. 13) due to gravitational force operating on the barrier arm 116. Upon returning to the first position 460, the breakaway assembly 440 may become re-engaged, with the magnetically-attractive elements 454 on the arm bracket 452 magnetically coupling with the drive magnets 450 on the drive bracket 448 (FIG. 13), allowing the actuator assembly 418 to resume normal operations. The breakaway assembly 440 may become automatically re-engaged by gravitational force in this manner from positions along the arc of movement 124 that the barrier arm 116 may be displaced by the abnormal force (other than positions proximate to the raised position 122 in which the magnetically-attractive elements 454 become magnetically engaged with the stop magnets 456).

Figure 17:
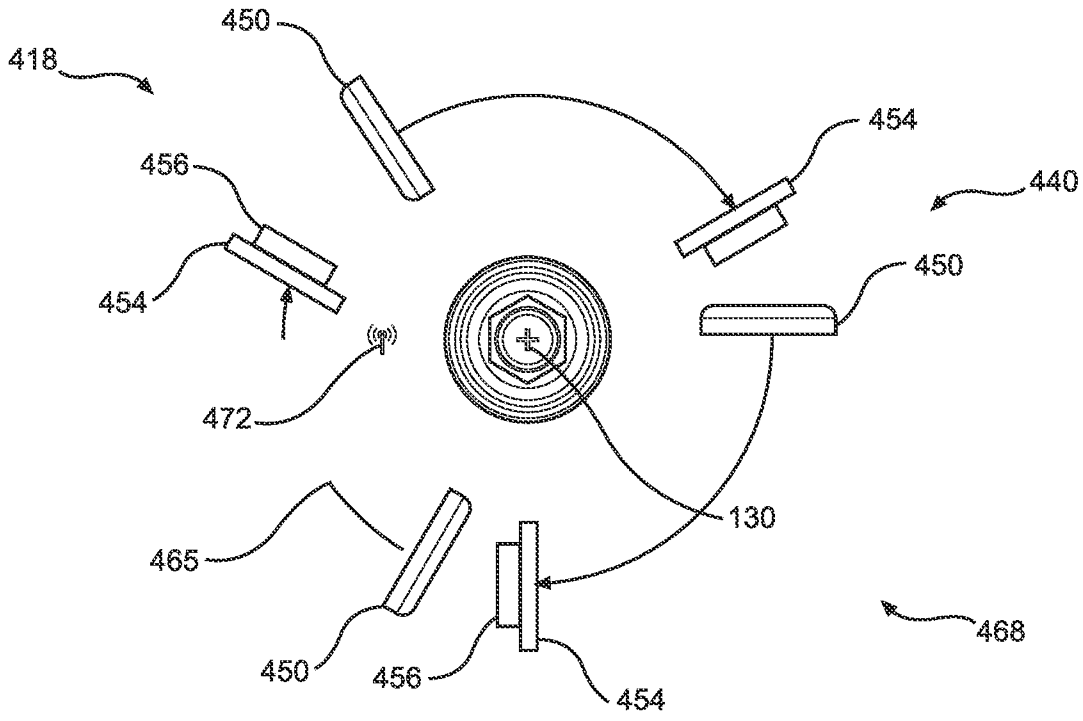
FIG. 17 is a partially cutaway view of the actuator assembly and the breakaway assembly of FIG. 13 in a fifth position in accordance with an example embodiment.

FIG. 17 shows the actuator assembly 418 (and breakaway assembly 440) in a fifth position 468 such as may occur when the abnormal force 415 has disengaged the breakaway assembly 440 and has continued to raise the barrier arm 116. More specifically, in the fifth position 468, following disengagement of the breakaway assembly 440, the abnormal force 415 applied to the barrier arm 116 has rotated the arm bracket 452 in the clockwise direction 465 about the axis of rotation 130 until the magnetically-attractive elements 454 have become magnetically engaged with the stop magnets 456. In some embodiments, the fourth position 468 corresponds with the barrier arm 116 being raised into the raised position 122 (FIG. 12).

In some embodiments, after the abnormal force 415 is removed from the barrier arm 116, the stop magnets 456 may continue to magnetically engage with the magnetically-attractive elements 454 of the arm bracket 452 with sufficient strength to overcome the gravitational force on the barrier arm 116, such that the barrier arm 116 remains held in the raised position 122 by the stop magnets 456. Alternately, in other embodiments, the stop magnets 456 may be eliminated, or if present, may not have sufficient strength to overcome the gravitational force operating on the barrier arm 116, and the barrier arm 116 may automatically return to the first position 460 (FIG. 13) under the operation of gravitational force as described above.

Referring again to FIG. 17, in some embodiments, when the stop magnets 456 have sufficient strength to maintain magnetic engagement with the magnetically-attractive elements 454 to hold the actuator assembly 418 (and breakaway assembly 440) in the fifth position 468, the barrier arm 116 may remain in the raised position 122 until further intervention occurs. In some embodiments, the intervention may take the form of an attendant or other suitable person manually disengaging the magnetically-attractive elements 454 from the stop magnets 456 by pulling down on the barrier arm 116, returning the barrier arm 116 to the lowered position 120 and the actuator assembly 418 to the first position 460 shown in FIG. 13, thus re-engaging the breakaway assembly 440 and returning to normal operations.

Alternately, in some embodiments, the actuator assembly 418 may remain in the fifth position 468 until a control system (e.g. control system 150) initiates a fetching operation to return the actuator assembly 418 to normal operations. For example, in some embodiments, the control system 150 may be configured to determine that the actuator assembly 418 has reached the fifth position 468 and in response, may initiate a fetching operation to return the actuator assembly 418 to normal operations. In other embodiments, an attendant or other suitable person may observe that the barrier system 410 needs to be reset, and may command the control system to initiate the fetching operation to return the actuator assembly 418 to normal operations (e.g. by pushing a reset button, etc.)

More specifically, in some embodiments, the fetching operation may include the motor 446 being actuated to rotate the drive bracket 448 in the clockwise direction 465, causing the drive magnets 450 on the drive bracket 448 to move into engagement with the magnetically-attractive elements 454 of the arm bracket 452, re-engaging the breakaway assembly 440 and returning the actuator assembly 418 to the third position 464 shown in FIG. 15. Once the actuator assembly 418 reaches the third position 464 and the breakaway assembly 440 has become re-engaged, the motor 446 may reverse direction and rotate the drive bracket 448 in the counter-clockwise direction 467 (FIG. 15) to pull the magnetically-attractive elements 454 away from the stop magnets 456. The motor 446 may then continue to rotate the drive bracket 448 and the arm bracket 452 in the counter-clockwise direction 467, returning the actuator assembly 418 to the first position 460 (FIG. 13) and returning the barrier arm 116 to the lowered position 120 (FIG. 12).

Figure 18:
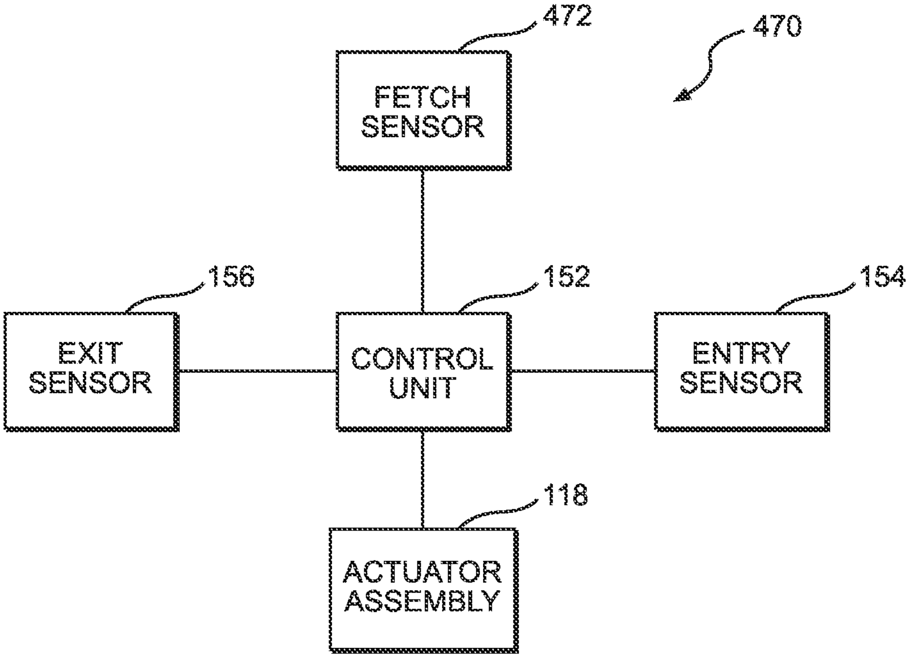
FIG. 18 is a schematic diagram of a control system of the vehicle barrier system of FIG. 12 in accordance with an example embodiment.

FIG. 18 shows a schematic diagram of a control system 470 that may be used to control the actuator assembly 418 of the vehicle barrier system 410 of FIGS. 12-17. In some embodiments, the control system 470 may include several of the components as described above with respect to the control systems 150, 160 shown in FIGS. 8 and 9 (e.g. a control unit 152, entry sensor 154, exit sensor 156, authorization system 162, etc.), and may perform the same functionalities as described above. In the embodiment shown in FIG. 18, however, the control system 470 also includes a fetch sensor 472. In some embodiments, the fetch sensor 472 may be positioned within the actuator assembly 418 (see FIG. 17), and may be operatively coupled to the control unit 152. The fetch sensor 472 may detect when the actuator assembly 418 has been placed in the fifth position 468 (FIG. 17) and requires re-setting to re-engage the breakaway assembly 440 and return the actuator assembly 418 to normal operations.

More specifically, the fetch sensor 472 may detect that the breakaway assembly 440 is disengaged and that the magnetically-attractive elements 454 have become magnetically engaged with the stop magnets 456. Upon detecting the actuator assembly 418 in the fifth position 468 (FIG. 17), the fetch sensor 472 may transmit a signal to the control unit 152 to initiate the fetching operation. In response, the control unit 152 may perform the above-described fetching operations, causing the actuator assembly 418 to re-engage the breakaway assembly 440 and to retrieve the barrier arm 116 from the raised position 122 and to move the barrier arm 116 to the lowered position 120 to return to (or commence) normal operations.

In some embodiments, if no fetch sensor 472 is present, then the barrier system 410 may simply rely on the next opening cycle of the actuator assembly to reset the barrier arm 116 position to what it should be (e.g. the lowered position 120, closed position, etc.). In this way, even without a fetch sensor 472 or fetching operations, successful recover of the barrier arm to normal operations may be achieved without external intervention.

Barrier systems that have a breakaway assembly in accordance with the present disclosure may provide considerable advantages over prior art barrier systems. Because the breakaway assembly releases the barrier arm from other components of the actuator assembly under the application of an abnormal force that exceeds a pre-determined threshold, the barrier system may be advantageously protected from damage. More specifically, upon application of the abnormal force 415, such as might be experienced from a vehicle 12 pushing or striking the barrier arm 116, instead of breaking the barrier arm 116 or the actuator assembly 418 (or both), the breakaway assembly 440 allows the arm bracket 452 to become disengaged from the drive bracket 448 so that the arm bracket 452 and the barrier arm 116 can move along the arc of movement 124 until the abnormal force 415 abates. In this way, damages to the barrier system may be reduced or eliminated, and the costs associated with repairing such damages may be mitigated or avoided. In addition, in some embodiments, the actuator assembly 418 having the breakaway assembly 440 may be quickly and efficiently returned to normal operational service, either by manually returning the barrier arm 116 to the lowered position 120 (or closed position) so that the breakaway assembly 440 becomes re-engaged, or by the barrier arm 116 automatically returning to the lowered position 120 by operation of gravitational forces, or by the control system performing a fetching operation to re-engage the breakaway assembly 440 and return the barrier system 410 to normal operations. Therefore, barrier systems having a breakaway assembly in accordance with the present disclosure may advantageously be returned to normal operations quickly and in a cost-efficient manner.

It will be appreciated that alternate embodiments may be readily conceived, and that embodiments of barrier systems in accordance with the present disclosure are not limited to the particular embodiments described above and shown in the accompanying figures. For example, although the actuator assembly 418 described above and shown in FIGS. 13-17 has a breakaway assembly 440 that includes three drive magnets 450 (and correspondingly three magnetically-attractive elements 454 and three stop magnets 456), it will be appreciated that in alternate embodiments, other suitable numbers of these components (450, 454, 456) could be employed. For example, alternate embodiments of actuator assemblies may be provided with a breakaway assembly having only one drive magnet 450 (and one magnetically-attractive element 454, and one stop magnet 456), or having only two drive magnets 450 (and two magnetically-attractive elements 454, and two stop magnets 456), or having four drive magnets 450 (and four magnetically-attractive elements 454, and four stop magnets 456), or any other suitable numbers of these components. In addition, as noted above, in some alternate embodiments, the stop magnets 456 may be eliminated. Generally speaking, in some embodiments, although an actuator assembly may have an equal number of drive magnets 450 and magnetically-attractive elements 454, there may be a fewer (or greater) number of stop magnets 456 depending upon the relative strengths of the magnets 450, 456.

Furthermore, although the breakaway assembly 440 shown in FIGS. 13-17 includes drive magnets 450 (and corresponding magnetically-attractive elements 454 and stop magnets 456) that are circumferentially spaced apart by equal distances around the axis of rotation 130, it should be appreciated that in alternate embodiments, these elements need not be spaced apart by equal distances. For example, in alternate embodiments of breakaway assemblies, the drive magnets 450 (and magnetically-attractive elements 454, and stop magnets 456) need not be equally spaced, and may instead be non-equally spaced about the axis of rotation 130. In still further embodiments, the drive magnets 450 (and magnetically-attractive elements 454, and stop magnets 456) need not be placed around the entire circumference of the axis of rotation 130, but rather, may be positioned within only a portion or region of the circumference (e.g. within a third of the circumference, half of the circumference, etc.).

In addition, it will be appreciated that, in alternate embodiments, the breakaway assembly 440 of FIGS. 13-17 may be implemented in an actuator assembly (such as actuator assembly 418) wherein the axis of rotation is oriented in a vertical direction. In such embodiments, the actuator assembly may selectively move the barrier arm between a closed position (that prohibits movement of the vehicle through the barrier system) and an open position (that allows the vehicle to pass through the barrier system), with the arc of movement of the barrier arm being confined within a horizontal plane of movement. Thus, in alternate embodiments wherein the axis of rotation is vertical, when the breakaway assembly 440 disengages as shown in FIG. 16, the gravitational force operating on the barrier arm may not automatically return the actuator assembly to the first position 460 (FIG. 13) after the abnormal force 415 is removed from the barrier arm. In some embodiments, when the breakaway assembly 440 is disengaged by the abnormal force 415 and the axis of rotation is vertical, then the actuator assembly 418 may need to be reset manually by an attendant, or by the actuator assembly 418 performing a fetching operation, such as the fetching operation described above.

Unless otherwise defined, all technical and scientific terms used herein have the same meaning as commonly understood by one of ordinary skill in the art to which this invention belongs. Although methods and materials similar to or equivalent to those described herein can be used in the practice or testing of the various embodiments of the present disclosure, suitable methods and materials are described above. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. The various embodiments of the present disclosure may be embodied in other specific forms without departing from the spirit or essential attributes thereof, and it is therefore desired that the various embodiments in the present disclosure be considered in all respects as illustrative and not restrictive. Any headings utilized within the description are for convenience only and have no legal or limiting effect.

What is claimed is:

1. A barrier system, comprising:

a barrier arm having a proximal end and a distal end opposite from the proximal end;

a main support attached to a support surface;

an actuator assembly coupled between the main support and the proximal end of the barrier arm, wherein the actuator assembly selectively, rotatably drives the barrier arm between a lowered position and a raised position causing the distal end of the barrier arm to move through an arc of movement; and a breakaway assembly that is magnetically engageable with the actuator assembly to rotate the barrier arm through the arc of movement and that is magnetically disengageable from the actuator assembly responsive to an abnormal force that exceeds a pre-determined force threshold applied to the barrier arm, wherein the barrier arm rotates freely through the arc of movement while the breakaway assembly is magnetically disengaged from the actuator assembly.

2. The barrier system of claim 1, wherein the arc of movement lies within a movement plane, the movement plane being sloped upwardly from the lowered position to the raised position by a slope angle.

3. The barrier system of claim 2, wherein the main support comprises a bollard that projects upwardly from the support surface at a tilt angle.

4. The barrier system of claim 3, wherein the slope angle of the movement plane is equal to the tilt angle of the bollard.

5. The barrier system of claim 1, wherein the actuator assembly includes:

a drive bracket that is driven by a motor and that is rotatably coupled to the main support; and an arm bracket coupled to the proximal end of the barrier arm, the drive bracket being coupled to the arm bracket by the breakaway assembly, the drive bracket and the arm bracket being rotatable about an axis of rotation as the barrier arm is rotated from the lowered position to the raised position.

6. The barrier system of claim 5, wherein the breakaway assembly includes:

at least one magnetically-attractive element coupled to the arm bracket and radially spaced apart from the axis of rotation, and at least one drive magnet coupled to the drive bracket and radially spaced apart from the axis of rotation and aligned with the at least one magnetically-attractive element when the drive bracket is engaged with the arm bracket.

7. The barrier system of claim 6, wherein the at least one drive magnet remains magnetically engaged to the at least one magnetically-attractive element as the motor of the actuator assembly is operated to rotate the barrier arm between the lowered position to the raised position; and wherein the at least one drive magnet disengages from the at least one magnetically-attractive element in response to an abnormal force applied to the barrier arm to disengage the drive bracket from the arm bracket when the abnormal force exceeds a pre-determined threshold.

8. The barrier system of claim 7, wherein the arm bracket rotates freely about the axis of rotation when the at least one drive magnet disengages from the at least one magnetically-attractive element in response to the abnormal force applied to the barrier arm.

9. The barrier system of claim 6, wherein the at least one magnetically-attractive element comprises at least two magnetically-attractive elements circumferentially disposed around the axis of rotation, and wherein the at least one drive magnet comprises at least two drive magnets circumferentially disposed around the axis of rotation, each of the at least two drive magnets being aligned with a corresponding one of the at least two magnetically-attractive elements when the drive bracket is engaged with the arm bracket.

10. The barrier system of claim 6, wherein the actuator assembly further includes at least one stop magnet coupled to the main support, the at least one stop magnet being radially spaced apart from the axis of rotation and aligned with the at least one magnetically-attractive element when the barrier arm is in the raised position.

11. The barrier system of claim 10, wherein the at least one stop magnet is strong enough to magnetically retain the barrier arm in the raised position against a gravitational force operating on the barrier arm when the arm bracket is disengaged from the drive bracket.

12. The barrier system of claim 10, wherein the at least one stop magnet is relatively weaker than the at least one drive magnet such that the at least one drive magnet may pull the at least one magnetically-attractive element away from the at least one stop magnet when the motor of the actuator assembly is operated to rotate the barrier arm from the raised position to the lowered position.

13. The barrier system of claim 10, further comprising a control system operatively coupled to the actuator assembly and wherein the control system:

detects that the barrier arm is being magnetically retained in the raised position by the at least one stop magnet; and responsive to determining that the barrier arm is being retained in the raised position:

actuates the actuator assembly to rotate the drive bracket to magnetically engage the at least one drive magnet with the at least one magnetically-attractive element; and actuates the actuator assembly to rotate the drive bracket to move the barrier arm from the raised position to the lowered position.

14. A barrier system, comprising:

a barrier arm having a proximal end and a distal end opposite from the proximal end;

a main support attached to a support surface;

an actuator assembly coupled between the main support and the proximal end of the barrier arm, wherein the actuator assembly selectively, rotatably drives the barrier arm between a lowered position and a raised position causing the distal end of the barrier arm to move through an arc of movement; and a breakaway assembly that is:

engageable with the actuator assembly to rotate the barrier arm through the arc of movement;

disengageable from the actuator assembly responsive to an abnormal force that exceeds a pre-determined force threshold applied to the barrier arm, wherein the barrier arm rotates freely through the arc of movement while the breakaway assembly is magnetically disengaged from the actuator assembly; and re-engageable with the actuator assembly to once again rotate the barrier arm through the arc of movement.

15. The barrier system of claim 14, wherein the barrier arm is rotated about a singular tilted axis.

16. The barrier system of claim 14, wherein the main support comprises a bollard that projects upwardly from the support surface at a tilt angle.

17. The barrier system of claim 16, wherein the arc of movement lies within a movement plane that is sloped upwardly from the lowered position to the raised position by a slope angle that is equal to the tilt angle of the bollard.

18. The barrier system of claim 14, wherein the main support comprises a bollard that projects downwardly from the support surface at a tilt angle.

19. The barrier system of claim 14, wherein the arc of movement lies within a movement plane, the movement plane being sloped upwardly from the lowered position to the raised position by a slope angle.

20. The barrier system of claim 14, wherein the actuator assembly includes:

a drive bracket that is driven by a motor and that is rotatably coupled to the main support; and an arm bracket coupled to the proximal end of the barrier arm, the drive bracket being coupled to the arm bracket by the breakaway assembly, the drive bracket and the arm bracket being rotatable about an axis of rotation as the barrier arm is rotated from the lowered position to the raised position.

* * * * *